(12) United States Patent
Cook et al.

(10) Patent No.: US 9,796,244 B2
(45) Date of Patent: Oct. 24, 2017

(54) THERMAL MANAGEMENT SYSTEM FOR A VEHICLE AND METHOD

(71) Applicant: Honda Motor Co., Ltd., Tokyo (JP)

(72) Inventors: Michael D Cook, Raymond, OH (US); Matthew R Scott, Raymond, OH (US); Joaquin A Pelaez, Raymond, OH (US); Timothy Bressau, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 528 days.

(21) Appl. No.: 14/158,012

(22) Filed: Jan. 17, 2014

(65) Prior Publication Data

US 2015/0204220 A1    Jul. 23, 2015

(51) Int. Cl.
| | |
|---|---|
| *F01P 3/20* | (2006.01) |
| *F01P 7/16* | (2006.01) |
| *F01N 5/02* | (2006.01) |
| *B60H 1/04* | (2006.01) |
| *F16H 57/04* | (2010.01) |

(52) U.S. Cl.
CPC ............ *B60H 1/04* (2013.01); *F01N 5/02* (2013.01); *F01P 3/20* (2013.01); *F16H 57/0417* (2013.01); *F01P 2060/045* (2013.01); *F01P 2060/08* (2013.01); *Y02T 10/16* (2013.01)

(58) Field of Classification Search
CPC ......... B60H 1/04; F01P 3/20; F01P 2060/045; F01P 2060/08; F01N 5/02; F16H 57/0417; Y02T 10/16
See application file for complete search history.

(56) References Cited

U.S. PATENT DOCUMENTS

| | | | |
|---|---|---|---|
| 3,874,183 | A | 4/1975 | Tabet |
| 3,886,814 | A | 6/1975 | Bullard et al. |
| 4,458,642 | A | 7/1984 | Okubo et al. |
| 4,512,300 | A | 4/1985 | DeVore et al. |
| 4,535,729 | A | 8/1985 | Faylor |
| 5,482,062 | A | 1/1996 | Chen |
| 5,551,384 | A | 9/1996 | Hollis |
| 5,638,774 | A | 6/1997 | Albertson et al. |

(Continued)

FOREIGN PATENT DOCUMENTS

| | | |
|---|---|---|
| CN | 101417608 A | 4/2009 |
| CN | 102168604 A | 8/2011 |

(Continued)

OTHER PUBLICATIONS

English translation of Office Action dated Dec. 2, 2016 to Chinese Patent Application No. 201410795377.0.

*Primary Examiner* — Hieu T Vo
*Assistant Examiner* — Arnold Castro
(74) *Attorney, Agent, or Firm* — Kenealy Vaidya LLP

(57) ABSTRACT

A thermal management system and method for a vehicle can include providing an engine, a transmission, a radiator, and a thermostat. A first heat exchanger can be in fluid communication with the transmission to heat or cool transmission fluid. A hot branch line can extend from the engine to the first heat exchanger to supply engine coolant to the first heat exchanger. The hot branch line can be in fluid communication with each of the engine and the first heat exchanger. A heat exchanger return line can be in fluid communication with each of the first heat exchanger and an inlet of the thermostat.

29 Claims, 5 Drawing Sheets

(56) References Cited

U.S. PATENT DOCUMENTS

| | | |
|---|---|---|
| 5,678,461 A | 10/1997 | Stine |
| 5,724,931 A | 3/1998 | Hollis |
| 5,730,089 A | 3/1998 | Morikawa et al. |
| 5,749,439 A | 5/1998 | Van Maanen |
| 5,960,872 A | 10/1999 | Huemer et al. |
| 6,151,891 A | 11/2000 | Bennett |
| 6,196,891 B1 | 3/2001 | Eckerskorn et al. |
| 6,401,670 B2 | 6/2002 | Frunzetti et al. |
| 6,427,640 B1 | 8/2002 | Hickey et al. |
| 6,457,564 B1 | 10/2002 | Damm et al. |
| 6,520,136 B2 | 2/2003 | Ito et al. |
| 6,530,347 B2 | 3/2003 | Takahashi et al. |
| 6,536,381 B2 | 3/2003 | Langervik |
| 6,591,896 B1 | 7/2003 | Hansen |
| 6,668,764 B1 | 12/2003 | Henderson et al. |
| 6,740,000 B2 | 5/2004 | Wakayama |
| 6,772,715 B2 | 8/2004 | Pfeffinger et al. |
| 6,913,068 B2 | 7/2005 | Togawa et al. |
| 7,069,880 B2 | 7/2006 | Hutchins |
| 7,073,467 B2 | 7/2006 | Kanno et al. |
| 7,077,776 B2 | 7/2006 | Sorab et al. |
| 7,124,715 B2 | 10/2006 | Hutchins |
| 7,261,068 B1 | 8/2007 | Wantschik |
| 7,267,086 B2 | 9/2007 | Allen et al. |
| 7,467,605 B2 | 12/2008 | Szalony et al. |
| 7,574,858 B2 | 8/2009 | Moody |
| 7,665,513 B2 | 2/2010 | Sasaki |
| 7,753,105 B2 | 7/2010 | Acre |
| 8,020,524 B2 | 9/2011 | Miyagawa |
| 8,042,609 B2 | 10/2011 | Samie et al. |
| 8,091,359 B2 | 1/2012 | Ulrey |
| 8,100,106 B2 | 1/2012 | Kardos et al. |
| 8,116,953 B2 | 2/2012 | Lopez |
| 8,162,797 B2 | 4/2012 | Pursifull |
| 8,205,709 B2 | 6/2012 | Gooden et al. |
| 8,348,807 B2 | 1/2013 | Pursifull |
| 8,409,055 B2 | 4/2013 | Gooden et al. |
| 8,413,434 B2 | 4/2013 | Prior et al. |
| 8,463,495 B2 | 6/2013 | Spohn et al. |
| 9,217,689 B2 * | 12/2015 | Rollinger ............... F01P 7/048 |
| 9,324,199 B2 * | 4/2016 | Pursifull ............... F01P 11/16 |
| 2004/0187805 A1 * | 9/2004 | Arisawa ............... F01P 7/162 |
| | | 123/41.14 |
| 2006/0060345 A1 | 3/2006 | Flik et al. |
| 2006/0060346 A1 * | 3/2006 | Sasaki ............... F01P 11/08 |
| | | 165/297 |
| 2006/0213462 A1 | 9/2006 | Horing et al. |
| 2007/0000728 A1 | 1/2007 | Pignard et al. |
| 2007/0137851 A1 | 6/2007 | Hamada et al. |
| 2007/0235164 A1 | 10/2007 | Miyagawa et al. |
| 2008/0073065 A1 | 3/2008 | Samie et al. |
| 2008/0173428 A1 | 7/2008 | Moser et al. |
| 2008/0190597 A1 | 8/2008 | Pantow |
| 2008/0223317 A1 | 9/2008 | Shintani et al. |
| 2009/0101312 A1 * | 4/2009 | Gooden ............... F16H 57/0413 |
| | | 165/104.19 |
| 2009/0114171 A1 * | 5/2009 | Hayashi ............... F01P 3/02 |
| | | 123/41.44 |
| 2009/0179509 A1 | 7/2009 | Gerundt et al. |
| 2009/0236435 A1 | 9/2009 | Kudo et al. |
| 2009/0241863 A1 | 10/2009 | Kimura et al. |
| 2009/0288617 A1 | 11/2009 | Hiyama |
| 2010/0031646 A1 * | 2/2010 | Iwase ............... F01N 5/02 |
| | | 60/320 |
| 2010/0058999 A1 | 3/2010 | Arnott |
| 2010/0095909 A1 * | 4/2010 | Lin ............... F01P 11/16 |
| | | 123/41.02 |
| 2010/0170455 A1 | 7/2010 | Feldhaus et al. |
| 2011/0067389 A1 | 3/2011 | Prior et al. |
| 2011/0120396 A1 | 5/2011 | Meyers et al. |
| 2011/0126783 A1 | 6/2011 | Hwang et al. |
| 2011/0131961 A1 | 6/2011 | Lee et al. |
| 2011/0203668 A1 | 8/2011 | Hofig et al. |
| 2011/0209865 A1 | 9/2011 | Samie et al. |
| 2011/0214629 A1 | 9/2011 | Benoit |
| 2011/0220072 A1 | 9/2011 | Seybold |
| 2011/0284200 A1 | 11/2011 | Gooden et al. |
| 2012/0048504 A1 | 3/2012 | Park et al. |
| 2012/0067545 A1 | 3/2012 | Yamazaki et al. |
| 2012/0074238 A1 | 3/2012 | Morita et al. |
| 2012/0102952 A1 | 5/2012 | Spohn et al. |
| 2012/0152487 A1 | 6/2012 | Styles et al. |
| 2012/0241141 A1 | 9/2012 | Taylor |
| 2012/0279699 A1 | 11/2012 | Kim |
| 2012/0312498 A1 | 12/2012 | Kim |
| 2013/0255604 A1 * | 10/2013 | Rollinger ............... F01P 7/048 |
| | | 123/41.15 |
| 2013/0255605 A1 * | 10/2013 | Jentz ............... F01P 11/16 |
| | | 123/41.15 |
| 2015/0204220 A1 * | 7/2015 | Cook ............... F01P 3/20 |
| | | 60/320 |

FOREIGN PATENT DOCUMENTS

| | | |
|---|---|---|
| EP | 2103789 A1 | 9/2009 |
| JP | 11264318 A | 9/1999 |
| JP | 2000130968 A | 5/2000 |
| JP | 2000130969 A | 5/2000 |
| JP | 2001253257 A | 9/2001 |
| JP | 2002039335 A | 2/2002 |
| JP | 2002039337 A | 2/2002 |
| JP | 2002039338 A | 2/2002 |
| JP | 2002061737 A | 2/2002 |
| JP | 2002070995 A | 3/2002 |
| JP | 2005114073 A | 4/2005 |
| JP | 2005299767 A | 10/2005 |
| JP | 2006125274 A | 5/2006 |
| JP | 2006207606 A | 8/2006 |
| JP | 2006283872 A | 10/2006 |
| JP | 2007016651 A | 1/2007 |
| JP | 2008128433 A | 6/2008 |
| JP | 2010151201 A | 7/2010 |
| JP | 2012162132 A | 8/2012 |
| KR | 2011049399 A | 5/2011 |
| KR | 2012136944 A | 12/2012 |
| WO | WO2012/063114 A1 | 5/2012 |

\* cited by examiner

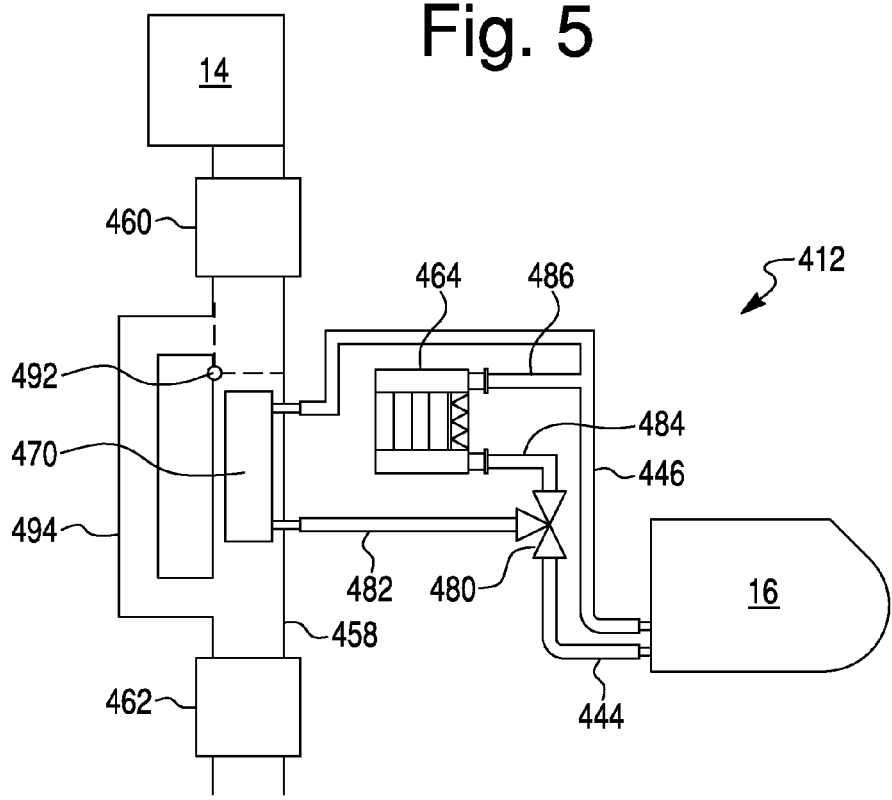
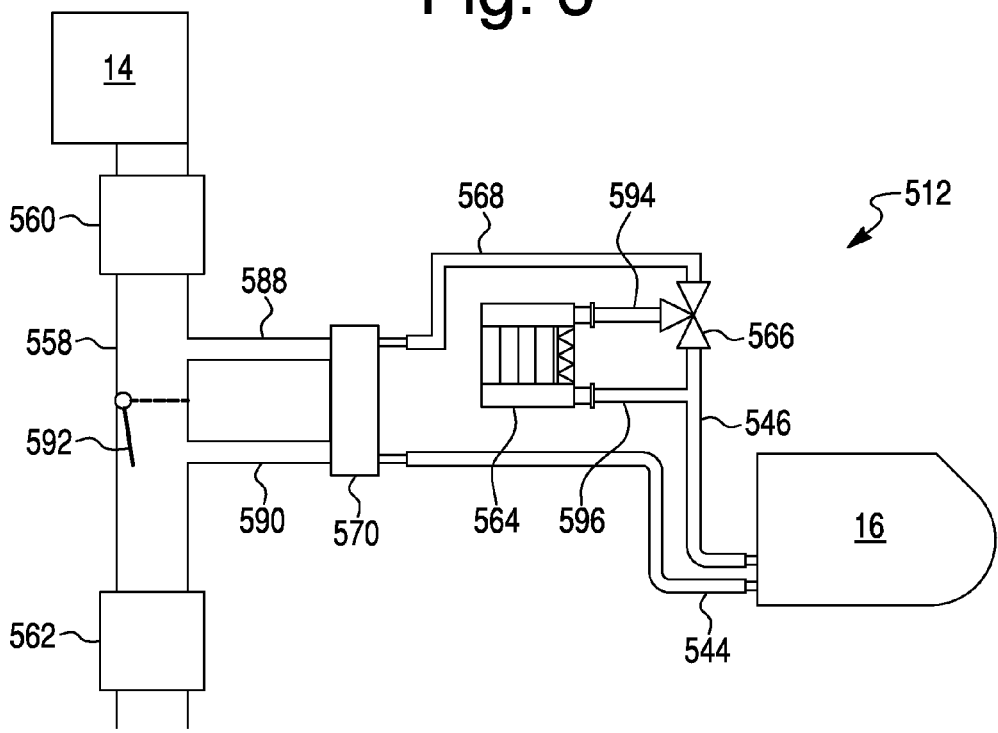

THERMAL MANAGEMENT SYSTEM FOR A VEHICLE AND METHOD

BACKGROUND

Description of the Related Art

The exhaust gas emissions of an internal combustion engine and the operating efficiency of powertrain components such as an internal combustion engine and a multiple speed ratio transmission are a function of the operating temperature of mechanical parts of the respective powertrain component and the operating temperature of the fluid(s) flowing through the respective powertrain component. At relatively low operating temperatures, the viscosity of lubricant in the engine and the transmission is relatively high and the reaction efficiency of the catalytic converter is relatively low. Thus, the operating efficiencies of the engine and the transmission are relatively low. Further, during a cold-start condition in cold weather, the warm-up rate of the passenger compartment can be relatively low. By contrast, under heavy load conditions, the components of the engine and/or the transmission can be subject to excessive thermal exposure. Thus, the operating efficiencies of the engine and the transmission can be reduced below an optimum value due to thermal stress, improper viscosity values, as well as other variables related to excessive thermal exposure.

SUMMARY

Thus, there is a need to provide a thermal management system that can efficiently regulate the flow and temperature of fluids (such as, but not limited to, engine coolant, engine oil, engine exhaust gas, transmission lubricating oil, and transmission hydraulic fluid) in the powertrain in order to minimize powertrain warm-up, maximize heat available for warming the passenger compartment and/or maintaining the powertrain fluids at optimum operating temperatures during all powertrain loads.

According to one aspect of the disclosure a thermal management system for a vehicle having an engine and a transmission, the system can include a radiator configured for fluid communication with the engine, a thermostat including an inlet, an outlet, and a valve structure, the inlet being in fluid communication with the radiator, the outlet being configured for fluid communication with the engine, and the valve structure movable between a first position and a second position such that when the valve is in the first position the valve substantially prevents fluid communication between the inlet and the outlet, and when the valve is in the second position the inlet is in fluid communication with the outlet, a first heat exchanger in fluid communication with the transmission, a hot branch line extending from the engine to the first heat exchanger and in fluid communication with each of the engine and the first heat exchanger, and a heat exchanger return line in fluid communication with each of the first heat exchanger and the inlet of the thermostat.

According to another aspect of the disclosed subject matter, the thermal management system can include a heater core in ambient fluid communication with a passenger compartment of the vehicle, the heater core being in separate fluid communication with the engine and the outlet of the thermostat such that fluid from the heater core returns directly to the engine and fluid from the engine flows to the heater core along a first circuit, and fluid from the engine flows to the first heat exchanger along a second circuit, and the first circuit and second circuit are parallel circuits with respect to each other.

According to another aspect of the disclosed subject matter, the thermal management system can include a heater core in ambient fluid communication with a passenger compartment of the vehicle, a first fluid circuit and a second fluid circuit. The first fluid circuit can be in fluid communication with the engine and the heater core such that fluid flows from the engine to the heater core, then flows through the heater core, and then flows from the heater core to the outlet of the thermostat. The second fluid circuit can be in fluid communication with the engine and the first heat exchanger such that fluid flows from the engine to the first heat exchanger, then flows through the first heat exchanger, and then flows to the inlet of the thermostat.

According to another aspect of the disclosed subject matter, the system can include a second heat exchanger, a valve in fluid communication with the first heat exchanger, the second heat exchanger and the transmission and configured to selectively operate in a first mode and selectively operate in a second mode, wherein when in the first mode, fluid from the first heat exchanger bypasses the second heat exchanger and flows to the transmission, and when in the second mode, fluid from the first heat exchanger flows through the second heat exchanger and then flows to the transmission.

According to another aspect of the disclosed subject matter, the system can include a heater core in fluid communication with the engine, an exhaust pipe in fluid communication with the engine, and a second heat exchanger in fluid communication with the exhaust pipe and the heater core.

According to another aspect of the disclosed subject matter, a thermal management system for a vehicle can include an engine, a transmission, an exhaust pipe in fluid communication with the engine, an exhaust gas heat exchanger in fluid communication with the exhaust pipe, a transmission fluid cooler, and a valve in fluid communication with the transmission, the exhaust gas heat exchanger and the transmission fluid cooler and configured to selectively operate in a first mode and selectively operate in a second mode, wherein when in the first mode, fluid from the transmission flows through one of the exhaust gas heat exchanger and the transmission fluid cooler and bypasses the other of the exhaust gas heat exchanger and the transmission fluid cooler, and when in the second mode, fluid from the transmission flows through at least the other of the exhaust gas heat exchanger and the transmission fluid cooler.

According to another aspect of the disclosed subject matter, a vehicle can include an engine, a transmission, and a thermal management system including: a radiator configured for fluid communication with the engine, a thermostat including an inlet, an outlet, and a valve structure, the inlet being in fluid communication with the radiator, the outlet being configured for fluid communication with the engine, and the valve structure movable between a first position and a second position such that when the valve is in the first position the valve substantially prevents fluid communication between the inlet and the outlet, and when the valve is in the second position the inlet is in fluid communication with the outlet, a first heat exchanger in fluid communication with the transmission, a hot branch line extending from the engine to the first heat exchanger and in fluid communication with each of the engine and the first heat exchanger, and a heat exchanger return line in fluid communication with each of the first heat exchanger and the inlet of the thermostat.

According to another aspect of the disclosed subject matter, a method for directing fluid through a vehicle thermal management system can include providing an engine including engine fluid configured to flow through the engine, providing a radiator in fluid communication with the engine, providing a thermostat including an inlet in fluid communication with the radiator and an outlet in fluid communication with the engine, providing a transmission connected to the engine, providing a first heat exchanger in fluid communication with the transmission and in separate fluid communication with the engine and the inlet of the thermostat, circulating the engine fluid through the engine radiator, the engine, and the first heat exchanger, causing the engine fluid exiting the first heat exchanger to directly enter the inlet of the thermostat, and circulating transmission fluid through the transmission and the first heat exchanger.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a schematic view of a fourth embodiment of a thermal management system for a vehicle made in accordance with principles of the disclosed subject matter.

FIG. 6 is a schematic view of a fifth embodiment of a thermal management for system a vehicle made in accordance with principles of the disclosed subject matter.

DETAILED DESCRIPTION OF EXEMPLARY EMBODIMENTS

Figure 1:
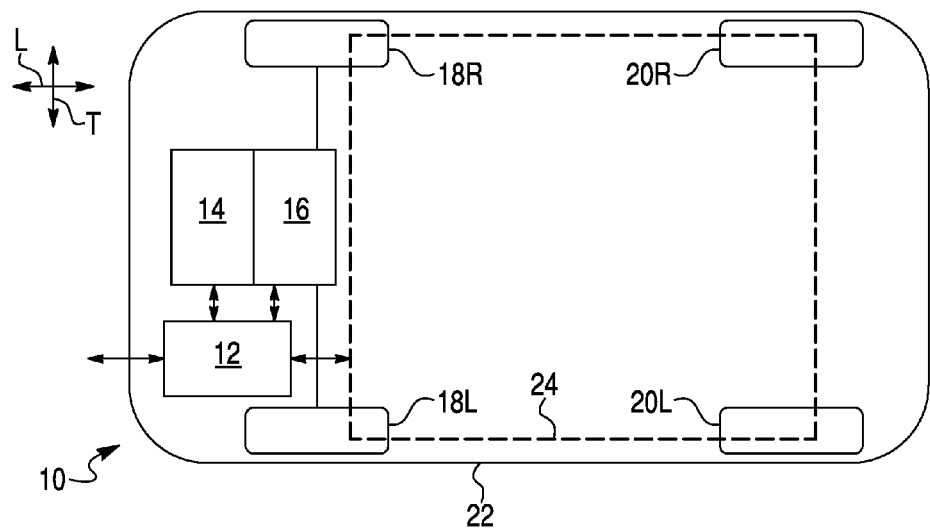
FIG. 1 is a schematic view of an exemplary embodiment of a vehicle including a thermal management system made in accordance with principles of the disclosed subject matter.

FIG. 1 schematically illustrates a vehicle 10 that can include an exemplary thermal management system 12 made in accordance with principles of the disclosed subject matter. The vehicle 10 can include an internal combustion engine 14, a transmission 16, a pair front wheels 18L,R, a pair of rear wheels 20L,R, and a body 22. The body 22 can include a passenger compartment 24 (indicated schematically by a dashed line).

The system 12 can control fluid communication (indicated by the double headed arrows) between the internal combustion engine 14, the transmission 16, the passenger compartment 24, and the ambient environment in order to regulate the heat transfer amongst the engine 14, the transmission 16, and the passenger compartment 24. The thermal management system 12 can improve fuel efficiency of the vehicle 10, minimize emissions resulting from combustion in the engine 14, enhance responsiveness of the climate control for the passenger compartment 24, and/or minimize the thermal effects on the engine 14 and/or the transmission 16.

Figure 2:
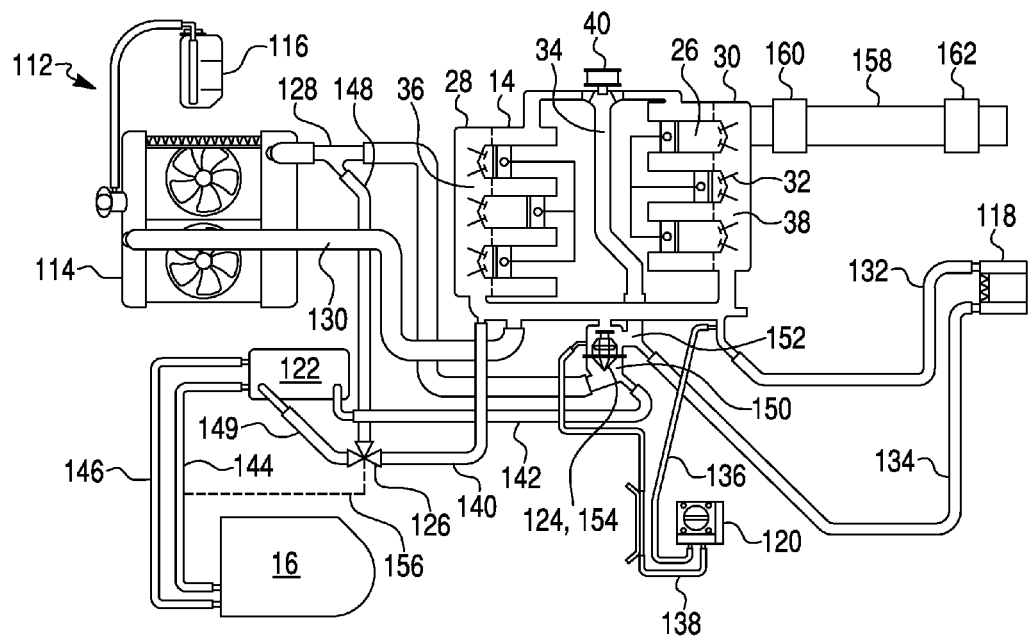
FIG. 2 is a schematic view of a first embodiment of a thermal management system for a vehicle made in accordance with principles of the disclosed subject matter.

FIG. 2 illustrates a first exemplary embodiment of a thermal management system 112 in accordance with the principles of the disclosed subject matter. The fluids acted upon by the system 112 can be engine fluid (such as but not limited to water, ethylene glycol, a combination of water and ethylene glycol, and exhaust gas), transmission fluid (such as, but not limited to, lubricating oil and hydraulic oil (also known as automatic transmission fluid or ATF)), ambient air, and air inside the passenger compartment.

This exemplary first embodiment of the thermal management system 112 can include a radiator 114, a reservoir 116, a heater core 118, a first heat exchanger 122, a thermostat 124, a control valve 126, and a plurality of conduits 128, 130, 132, 134, 136, 138, 140, 142, 144, 146, 148.

FIG. 2 also schematically illustrates further exemplary details of the engine 14. The engine 14 can include one or more combustion cylinders 26 that can be arranged along a straight line, in a V-shape, in a W-shape, or horizontally opposed. In the exemplary embodiment of FIG. 2, the engine 14 can include a plurality of cylinders 26 arranged in a first bank 28 and a second bank 30. The first and second banks 28, 30 can be arranged in a V-shape or the banks 28, 30 can be horizontally opposed. Each cylinder 26 can include at least one exhaust valve 32 that can be configured to selectively connect the respective cylinder 26 for fluid communication with the ambient environment via an exhaust system, as will be described in further detail below.

The thermal management system 112 can include a water jacket formed in the engine 14. In the exemplary embodiment schematically represented in FIG. 2, the water jacket can include an inlet portion 34 and two bank portions 36, 38. The inlet portion 34 can be in fluid communication with an outlet 152 of the thermostat 124. Each of the bank portions 36, 38 can be in fluid communication with the inlet portion 34 and with a main fluid supply conduit 130. Heat generated in each of the cylinders 26 can be transferred to the engine fluid flowing through the water jacket 34, 36, 38 and then distributed throughout the thermal management system 112 and/or the ambient environment in a manner most advantageous for the operating conditions of the vehicle and the climate control request(s) for the passenger cabin.

The thermal management system 112 can include a water pump 40 that can be in fluid communication with the water jacket 34, 36, 38 and can cause the engine fluid to circulate through the thermal management system 112. The water pump 40 can be driven by the engine 14 or by a separate power source, such as but not limited to, an electric motor.

The radiator 114 can facilitate the transfer of heat from the engine fluid to the air of the ambient environment in order to cool the engine fluid. The radiator 114 can receive fluid from the engine 14 and receive air from the ambient environment. Engine fluid in the radiator 114 can be selectively returned to the engine 14 via the thermostat 124.

During a cold-start condition, the temperature of the engine fluid flowing through the water jacket 34, 36, 38 is below a first predetermined temperature. When the engine fluid is below this first predetermined temperature, the viscosity of the engine oil can be relatively high. Therefore, the friction between the moving components of the engine 14 can be relatively high and the resistance required to pump the engine oil through the engine and to move the engine components through the engine oil can be relatively high. This can reduce the energy available to propel the vehicle and/or increase the fuel consumption by the engine 14. Increased fuel consumption can reduce the effectiveness of the catalytic converter, especially if the optimum operating temperature of the catalyst has not been achieved.

Furthermore, the thermal demand on the engine fluid from the heater core 118 can be high during the cold-start condition. Since heat is lost by the engine fluid to the heater core 118, the duration of the cold-start condition can be increased.

When the transmission fluid is below a second predetermined temperature, the viscosity of the transmission fluid can be relatively high. Therefore, the friction between the moving components of the transmission 16 can be relatively high and the resistance required to pump the transmission fluid through the transmission 16 and to move the transmission components through the transmission fluid can be relatively high. This increased friction also can reduce the energy available to propel the vehicle and/or increase the fuel consumption by the engine 14. Increased fuel consumption can also reduce the effectiveness of the catalytic converter.

In order to minimize one or more of these potentially adverse effects, the thermal management system 112 can direct the flow of engine fluid to by-pass the radiator 114 and the first heat exchanger 122 and can simultaneously permit the flow of engine fluid to pass through the water jacket 34, 36, 38, the heater core 118 and the throttle body 120. As a result, the heat transfer rate between the engine 14 and the engine fluid can be a maximum value and the heat transfer rate between the engine fluid and each of the heater core 118 and the throttle body 120 and can be a maximum value. Thus, the time elapsed for warm-up of the engine 14, the engine fluid, and the passenger compartment can be minimized.

The thermostat 124 can include a thermostat inlet 150, a thermostat outlet 152 and a thermostat valve structure 154. A main fluid return conduit 128 can extend from the radiator 114 to the thermostat inlet 150 to provide communication of engine fluid from the radiator 114 to the thermostat inlet 150. The main fluid supply conduit 130 can extend from the engine 14 to the radiator 114 to provide communication of engine fluid from the engine 14 to the radiator 114. An actuator can be configured to cause the thermostat valve structure 154 to selectively open and close communication of engine fluid from the thermostat inlet 150 to the thermostat outlet 152.

The actuator can be responsive to the temperature of the fluid exiting the engine 14 in order to cause the thermostat valve structure 154 to selectively open and close the communication of engine fluid from the thermostat inlet 150 to the thermostat outlet 152. The actuator can be configured to cause the thermostat valve structure 154 to close communication of engine fluid from the thermostat inlet 150 to the thermostat outlet 152 when the temperature of the engine fluid is less than the first predetermined temperature described above. The actuator can be configured to cause the thermostat valve structure 154 to open communication of engine fluid from the thermostat inlet 150 to the thermostat outlet 152 when the temperature of the engine fluid is equal to or greater than the first predetermined temperature described above. The actuator can be a mechanical structure such as, but not limited to, a wax motor in combination with a spring. In an alternate embodiment, the actuator can be an electrically driven device (such as, but not limited to a thermal sensor in electrical communication with a solenoid or an electric motor) that can be actuated by an input signal received from a thermal sensor and/or an electronic control unit. The thermal sensor can be in fluid communication with the engine fluid exiting the engine 14.

When the actuator causes the thermostat valve structure 154 to close fluid communication from the thermostat inlet 150 to the thermostat outlet 152, engine fluid from the radiator 114 can be prevented from entering the engine 14, or at least limited to a negligible flow rate value into the engine 14. Since the flow rate of engine fluid through the thermostat 124 can be zero or limited to a negligible value, the flow rate of engine fluid from the engine 14 to the radiator 114 via the main fluid supply conduit 130 can be zero or limited to a negligible value. Therefore, engine fluid flowing through the water jacket 34, 36, 38 can by-pass the radiator 114.

When the temperature of the engine fluid is greater than or equal to the first predetermined temperature, the actuator can cause the valve structure 154 to open fluid communication from the thermostat inlet 150 to the thermostat outlet 152. Thus, engine fluid from the radiator 114 can flow through the thermostat 124 and into the engine 14 at a flow rate sufficient to maintain the operating temperature of the engine fluid within a desired range of temperature values that can be advantageous for engine performance.

The reservoir 116 can be in fluid communication with the radiator 114. The reservoir 116 can store fluid that can be used to replace fluid lost from the volume of fluid circulating in the thermal management system 112. The reservoir 116 can be used to relieve the pressure of the fluid circulating in the system 112 under certain operating conditions.

The heater core 118 can facilitate the transfer of heat from the engine fluid to the ambient air in the passenger compartment (see, for example, 24 in FIG. 1) in order to warm the ambient air in the passenger compartment. A heater supply conduit 132 can extend from the engine 14 to the heater core 118 to provide communication of engine fluid from the engine 14 to the heater core 118. As viewed in FIG. 2, the heater supply conduit 132 can extend from the engine 14 at a position in fluid communication with the right bank portion 38.

The thermal management system 112 can include a fan and ducting located in the passenger compartment. The fan and ducting are omitted from FIG. 2 for clarity. The fan and ducting can be configured to circulate the ambient air of the passenger compartment between the passenger compartment and the heater core 118.

A heater return line 134 can extend from the heater core 118 to the thermostat outlet 152 to provide communication of engine fluid from the heater core 118 to the engine 14. Since the heater return line 134 connects to the thermostat outlet 152, engine fluid can circulate through the heater core 118 independently of the operation of the thermostat 124. Thus, the thermal management system 112 can minimize the time for warming the passenger compartment.

The throttle body 120 can be configured to facilitate the transfer of heat from the engine fluid to the throttle body 120 in order to warm the throttle body. The throttle body 120 can receive engine fluid from the engine 14. The heater core 118 and the throttle body 120 can be connected to the engine 14 in parallel fluid communication. In other words, at any given instant in time, the fluid within a circuit that contains the heater core 118 is substantially (i.e., completely or almost completely) isolated from the fluid within a circuit that contains the throttle body 120 (both circuits excluding the engine 14 and functional connectors/valves).

A throttle supply conduit 136 can extend from the engine 14 to the throttle body 120 to provide communication of engine fluid from the engine 14 to the throttle body 120. As viewed in FIG. 2, the throttle supply conduit 136 can extend from the engine 14 at a position in fluid communication with the right bank portion 38.

A throttle return line 138 can extend from the throttle body 120 to the thermostat outlet 152 to provide communication of engine fluid from the throttle body 120 to the engine 14. Since the throttle return line 138 connects to the thermostat outlet 152, engine fluid can circulate through the throttle body 120 independently of the operation of the thermostat 124.

Thus, the thermal management system 112 can minimize the time for warming the passenger compartment and for generally stabilizing operating temperatures of the throttle body 120, engine 14, and transmission 16.

The conduits 136, 138 can be omitted, if desired.

The first heat exchanger 122 can receive engine fluid from the engine 14 and can receive transmission fluid from the transmission 16. In a transmission warming mode of operation of the thermal management system 112, the first heat exchanger 122 can facilitate the transfer of heat from the engine fluid to the transmission fluid in order to warm the transmission fluid. In a transmission cooling mode of operation of the system 112, the exchanger 122 can facilitate the transfer of heat from the transmission fluid to the engine fluid in order to cool the transmission fluid. Further details of these two modes of operation will be provided below.

The thermal management system 112 can include a hot branch line that extends from the engine 14 to the first heat exchanger 122 to be in fluid communication. The control valve 126 can include a cool inlet, a warm inlet and an outlet 149. The hot branch line can include or can consist essentially of an exchanger supply line 140, the control valve 126 and the valve outlet 149. An exchanger supply conduit 140 can extend from the engine 14 to a warm inlet of the control valve 126 to provide communication of engine fluid from the engine 14 to the control valve 126 in a path parallel to each of the heater core path and the throttle body path (e.g., in a path in which no mixing of coolant occurs except upon return to the water jacket at the engine 14, just past the thermostat 124, for example). As viewed in FIG. 2, the exchanger supply conduit 140 can extend from the engine 14 at a position in fluid communication with the left bank portion 36.

An exchanger branch conduit 148 can extend from the main fluid return conduit 128 to a cool inlet of the control valve 126 to provide communication of engine fluid from the exchanger branch conduit 148 to the control valve 126.

The valve outlet 149 can connect the control valve 126 for communication of engine fluid from the control valve 126 to the first heat exchanger 122. If the control valve 126 is mounted directly to the first heat exchanger 122, the valve outlet 149 can be directly connected to the inlet of the first heat exchanger 122. If the valve 126 is mounted at a distance from the first heat exchanger 122, the valve outlet 149 can include a conduit extending from the control valve 126 to the first heat exchanger 122. Thus, a supply of engine fluid warmed by heat generated by the engine 14 is available to the first heat exchanger 122 and a supply of engine fluid cooled by the radiator 114 is available to the first heat exchanger 122.

An exchanger return conduit 142 can extend from the first heat exchanger 122 to the thermostat inlet 150 to provide communication of engine fluid from the first heat exchanger 122 to the thermostat 124. Thus, the flow of engine fluid to the first heat exchanger 122 can be controlled by the thermostat 124. Specifically, when the thermostat 124 closes fluid communication from the thermostat inlet 150 to the thermostat outlet 152, the flow rate of engine fluid from the bank portion 36 and/or the bank portion 38 to the exchanger supply conduit 140 can be restricted to zero or a negligible value or possibly a range between fully open and fully closed. Conversely, the thermostat 124 can permit fluid communication from the bank portion 36 and/or the bank portion 38 to the exchanger supply conduit 140 when the thermostat opens fluid communication between the inlet 150 and the outlet 152. As a result, the rate of heat transfer from the engine fluid to the transmission fluid via the exchanger 122 can be a negligible value during the cold-start condition. This can minimize the time elapsed for the engine fluid to reach at least the first predetermined temperature and the transmission fluid to reach at least the second predetermined temperature.

A transmission supply conduit 144 can extend from the transmission 16 to the first heat exchanger 122 to provide communication of transmission fluid from the transmission 16 to the first heat exchanger 122. A transmission return conduit 146 can extend from the exchanger 122 to the transmission 16 to provide communication of transmission fluid from the exchanger 122 to the transmission 16.

The control valve 126 can selectively connect the first heat exchanger 122 in communication with engine fluid from either the exchanger supply conduit 140 or the exchanger branch conduit 148. As a result, the exchanger 122 can either warm or cool the transmission fluid flowing through the exchanger 122.

The control valve 126 can be configured to open fluid communication between the exchanger branch conduit 148 and the first heat exchanger 122 and to simultaneously close fluid communication between the exchanger supply conduit 140 and the exchanger 122 when the temperature of the transmission fluid exiting the transmission 16 is greater than or equal to a second predetermined temperature. The control valve 126 can be configured to close fluid communication between the exchanger branch conduit 148 and the first heat exchanger 122 and to simultaneously open fluid communication between the exchanger supply conduit 140 and the exchanger 122 when the temperature of the transmission fluid exiting the transmission 16 is less than a second predetermined temperature. The second predetermined temperature can correspond to an optimum operating temperature for the transmission fluid.

To accomplish this selective warming or cooling of the transmission fluid, the valve 126 can include an actuator and a valve structure. The actuator can be configured to cause the valve structure to selectively open fluid communication between the valve outlet 149 and one of the warm inlet and the cool inlet while simultaneously closing fluid communication between the valve outlet 149 and the other of the warm inlet and the cool inlet. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit. In the case of the actuator being configured as a mechanical structure, the communication line 156 of FIG. 1 schematically represents a conduit that can be in fluid communication with the transmission supply conduit 144 and the actuator of the valve 126. In the case of the actuator being configured as an electrically driven device, the communication line 156 of FIG. 1 schematically represents an electrical signal line that can be in electrical communication with the control valve 122 and in electrical communication with an electronic control unit and/or a thermal sensor. The thermal sensor can be in fluid communication with the transmission supply conduit 144.

As discussed above, when fluid communication is closed between the thermostat inlet 150 and the thermostat outlet 152, the flow rate of engine fluid through the exchanger 122 can be zero or a negligible value because the exchanger return conduit 142 is in fluid communication with the inlet 150.

While the thermostat 124 opens communication of engine fluid from the thermostat inlet 150 to the thermostat outlet 152, the first heat exchanger 122 can facilitate heat transfer from the engine fluid to the transmission fluid when the control valve 126 opens communication of engine fluid from the exchanger supply line 140 to the first heat exchanger 122 and closes fluid communication between the first heat exchanger 122 and the exchanger branch conduit 148. Thus, the time period for the transmission fluid to reach a temperature within a range of operating values can be minimized which can reduce the impact of the potentially adverse effects described above.

While the thermostat 124 opens communication of engine fluid from the thermostat inlet 150 to the thermostat outlet 152, the first heat exchanger 122 can facilitate heat transfer from the transmission fluid to the engine fluid when the control valve 126 closes fluid communication between the exchanger supply conduit 140 and the first heat exchanger 122 and opens communication of engine fluid from the exchanger branch conduit 148 to the first heat exchanger 122. Thus, the transmission fluid can be maintained within a range of temperature values that can be advantageous for transmission performance.

The thermal management system 112 can include an exhaust system in fluid communication with the engine 14. The exhaust system can include an exhaust pipe 158 in selective fluid communication with the engine 14 via the exhaust valve 32, a catalytic converter 160 in fluid communication with the pipe 158 and a muffler 162 in fluid communication with the pipe 158. The pipe 158 can extend from the engine 14 to the converter 160, from the converter 160 to the muffler 162, and from the muffler 162 to terminate at an open end adjacent the rear of the vehicle. The open end of the pipe 158 can be in fluid communication with the ambient environment. In addition to expelling exhaust gas produced in the cylinders 26 of the engine 14, the exhaust system 158, 160, 162 can transfer heat produced by the engine and carried by the exhaust gas to the ambient environment.

Figure 3:
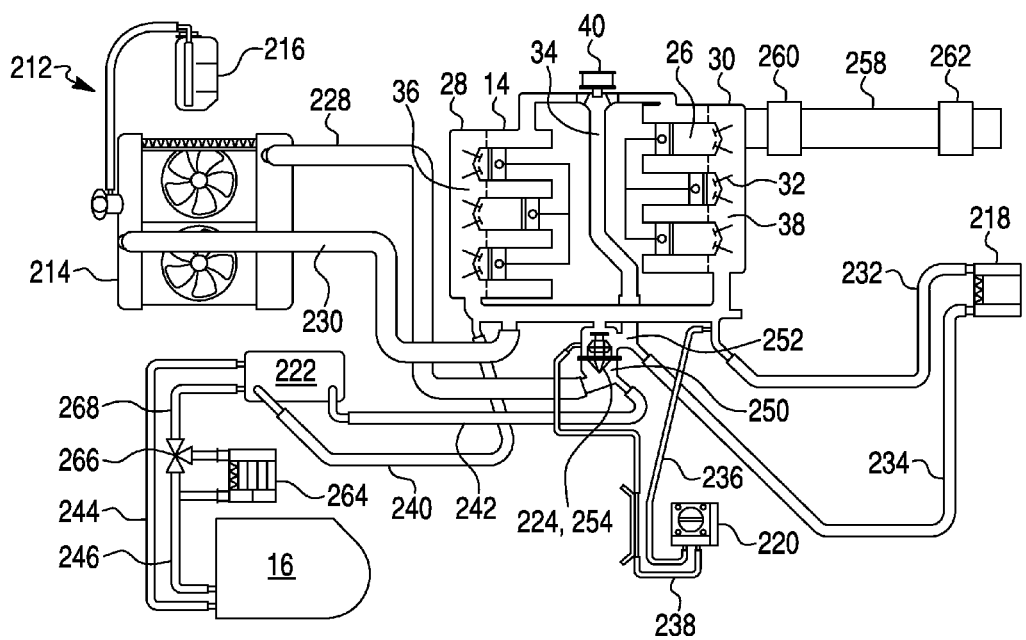
FIG. 3 is a schematic view of a second embodiment of a thermal management system for a vehicle made in accordance with principles of the disclosed subject matter.

FIG. 3 illustrates a second exemplary embodiment of a thermal management system 212 in accordance with the principles of the disclosed subject matter. The fluids acted upon by the system 212 can be engine fluid (such as but not limited to water, ethylene glycol, a combination of water and ethylene glycol, and exhaust gas), transmission fluid (such as, but not limited to, lubricating oil and hydraulic oil (also known as automatic transmission fluid or ATF), ambient air, and ambient air inside the passenger compartment.

This exemplary second embodiment of the thermal management system 212 can include a radiator 214, a reservoir 216, a heater core 218, a first heat exchanger 222, a thermostat 224, a second heat exchanger 264, a by-pass valve 266, and a plurality of conduits 228, 230, 232, 234, 236, 238, 240, 242, 244, 246, 268.

FIG. 3 also schematically illustrates further exemplary details of the engine 14. The engine 14 can include one or more combustion cylinders 26, a first bank 28, a second bank 30, and one or more exhaust valves 32. The thermal management system 212 can also include a water pump 40 and a water jacket 34, 36, 38.

The radiator 214 can facilitate the transfer of heat from the engine fluid to the air of the ambient environment in order to cool the engine fluid. The radiator 214 can receive fluid from the engine 14 and receive air from the ambient environment. Engine fluid in the radiator 214 can be selectively returned to the engine 14 via the thermostat 224, as will be described in detail below.

In order to minimize one or more of the potentially adverse effects discussed above, the thermal management system 212 can direct the flow of engine fluid to by-pass the radiator 214 and the first heat exchanger 222 and can simultaneously permit the flow of engine fluid to pass through the water jacket 34, 36, 38, the heater core 218 and the throttle body 220. As a result, the heat transfer rate between the engine 14 and the engine fluid can be a maximum value and the heat transfer rate between the engine fluid and each of the heater core 218 and the throttle body 220 and can be a maximum value. Thus, the time elapsed for warm-up of the engine 14, the engine fluid, and the passenger compartment can be minimized.

The thermostat 224 can include a thermostat inlet 250, a thermostat outlet 252 and a thermostat valve structure 254. A main fluid return conduit 228 can extend from the radiator 214 to the thermostat inlet 250 to provide communication of engine fluid from the radiator 214 to the thermostat inlet 250. The main fluid supply conduit 230 can extend from the engine 14 to the radiator 214 to provide communication of engine fluid from the engine 14 to the radiator 214. The actuator can be configured to cause the thermostat valve structure 254 to selectively open and close fluid communication between the thermostat inlet 250 and the thermostat outlet 252, for example, as described above with respect to FIG. 2.

When the actuator causes the thermostat valve structure 254 to close fluid communication from the thermostat inlet 250 to the thermostat outlet 252, engine fluid from the radiator 214 can be prevented from entering the engine 14, or at least limited to a negligible flow rate value into the engine 14. Since the flow rate of engine fluid through the thermostat 224 can be zero or limited to a negligible value, the flow rate of engine fluid from the engine 14 to the radiator 214 via the main fluid supply conduit 230 can be zero or limited to a negligible value. Therefore, engine fluid flowing through the water jacket 34, 36, 38 can by-pass the radiator 214.

When the temperature of the engine fluid is greater than or equal to the first predetermined temperature, the actuator can cause the thermostat valve structure 254 to open fluid communication from the thermostat inlet 250 to the thermostat outlet 252. Thus, engine fluid from the radiator 214 can flow through the thermostat 224 and into the engine 14 at a flow rate sufficient to maintain the operating temperature of the engine within a desired range of temperature values that can be advantageous for engine performance.

The reservoir 216 can be in fluid communication with the radiator 214. The reservoir 216 can store fluid that can be used to replace fluid lost from the volume of fluid circulating in the thermal management system 212. The reservoir 216 can be used to relieve the pressure of the fluid circulating in the system 212 under certain operating conditions.

The heater core 218 can facilitate the transfer of heat from the engine fluid to the ambient air in the passenger compartment 24 in order to warm the ambient air in the passenger compartment. A heater supply conduit 232 can extend from the engine 14 to the heater core 218 to provide communication of engine fluid from the engine 14 to the heater core 218. As viewed in FIG. 3, the heater supply conduit 232 can extend from the engine 14 at a position in fluid communication with the right bank portion 38.

The thermal management system 212 can include a fan and ducting located in the passenger compartment. The fan and ducting are omitted from FIG. 3 for clarity. The fan and ducting can be configured to circulate the ambient air of the passenger compartment between the passenger compartment and the heater core 218.

A heater return line 234 can extend from the heater core 218 to the thermostat outlet 252 to provide communication of engine fluid from the heater core 218 to the engine 14. Since the heater return line 234 connects to the thermostat outlet 252, engine fluid can circulate through the heater core 218 independently of the operation of the thermostat 224. Thus, the thermal management system 212 can minimize the time for warming the passenger compartment and providing benefits of temperature stabilization within the radiator 16, engine 14, throttle body, and other components of the vehicle.

The throttle body 220 can be configured to facilitate the transfer of heat from the heated fluid in order to warm the throttle body 220. The throttle body 220 can receive heated fluid from the engine 14.

A throttle supply conduit 236 can extend from the engine 14 to the throttle body 220 to provide communication of engine fluid from the engine 14 to the throttle body 220. As viewed in FIG. 3, the throttle supply conduit 236 can extend from the engine 14 at a position in fluid communication with the right bank portion 38.

A throttle return line 238 can extend from the throttle body 220 to the thermostat outlet 252 to provide communication of engine fluid from the throttle body 220 to the engine 14. Since the throttle return line 238 connects to the thermostat outlet 252, engine fluid can circulate through the throttle body 220 independently of the operation of the thermostat 224.

Thus, the thermal management system 212 can minimize the time for warming the passenger compartment and for generally stabilizing operating temperatures of the throttle body 120, engine 14, and transmission 16.

Of course, the conduits 236, 238 can be omitted, if desired.

The first heat exchanger 222 can receive engine fluid from the engine and can receive transmission fluid from the transmission 16. The second heat exchanger 264 can receive transmission fluid from the transmission 16 and can receive air from the ambient environment. In a transmission warming mode of operation of the thermal management system 212, the first heat exchanger 222 can facilitate the transfer of heat from the engine fluid to the transmission fluid in order to warm the transmission fluid. In a transmission cooling mode of operation of the system 212, the first heat exchanger 222 can facilitate the transfer of heat from the transmission fluid to the engine fluid in order to cool the transmission fluid and, optionally, the second heat exchanger 264 can facilitate the further transfer of heat from the transmission fluid to the air in the ambient environment in order to further cool the transmission fluid.

The thermal management system 212 can include a hot branch line that can extend from the engine 14 to the first heat exchanger 222 to be in fluid communication. The hot branch line can include or can consist essentially of an exchanger supply conduit 240. The exchanger supply conduit 240 can extend from the engine 14 to the first heat exchanger 222 to provide communication of engine fluid from the engine 14 in a path parallel to the heater core path and the throttle body path. Thus, a supply of engine fluid warmed by heat generated by the engine 14 is available to the first heat exchanger 222. Further it is possible that under certain operating conditions for the engine 14 and the transmission 16, the temperature of the warmed engine fluid can be less than the temperature of the transmission fluid, even if the temperature of the warmed engine fluid is greater than or equal to the first predetermined temperature described above. Thus, the transmission fluid can be warmed or cooled by the engine fluid exiting the engine 14 via the exchanger supply conduit 240, depending on the relative temperatures of the engine fluid and the transmission fluid. As viewed in FIG. 3, the exchanger supply conduit 240 can extend from the engine 14 at a position in fluid communication with the left bank portion 36.

An exchanger return conduit 242 can extend from the first heat exchanger 222 to the thermostat inlet 250 to provide communication of engine fluid from the first heat exchanger 222 to the thermostat 224. Thus, the flow of engine fluid to the first heat exchanger 222 can be controlled by the thermostat 224. Specifically, when the thermostat 224 closes fluid communication between the thermostat inlet 250 and the thermostat outlet 252, the flow rate of engine fluid from the bank portion 36 and/or the bank portion 38 to the exchanger supply conduit 240 can be zero or a negligible value. Conversely, the thermostat 224 can permit fluid communication from the bank portion 36 and/or the bank portion 38 to the exchanger supply conduit 240 when the thermostat opens fluid communication between the inlet 250 and the outlet 252. As a result, the rate of heat transfer from the engine fluid to the transmission fluid via the exchanger 222 can be a negligible value during the cold-start condition. This can minimize the time elapsed for the engine fluid to reach at least the first predetermined temperature and the transmission fluid to reach at least the second predetermined temperature.

A transmission supply conduit 244 can extend from the transmission 16 to the first heat exchanger 222 to provide communication of transmission fluid from the transmission 16 to the first heat exchanger 222.

An intermediate conduit 268 can extend from the first heat exchanger 222 to an inlet of the by-pass valve 266 to provide fluid communication from the exchanger 222 to the by-pass valve 266. The by-pass valve 266 can have a first outlet in fluid communication with a transmission return conduit 246. The transmission return conduit 246 can extend from the valve 266 to the transmission 16 to provide communication of transmission fluid from the by-pass valve 266 to the transmission 16. The by-pass valve 266 can have a second outlet in fluid communication with the second heat exchanger 264.

The second heat exchanger 264 can include an outlet in fluid communication with the transmission return conduit 246 at a location downstream from the by-pass valve 266.

The by-pass valve 266 can selectively connect the first heat exchanger 222 in communication with transmission fluid from the transmission return conduit 246 or with transmission fluid from the second heat exchanger 264. As a result, the first heat exchanger 222, alone, can either warm or cool the transmission fluid flowing through the first heat exchanger 222 or, alternatively, the first heat exchanger 222 and the second heat exchanger 264 can sequentially cool the transmission fluid.

The by-pass valve 266 can be configured to open fluid communication from the first heat exchanger 222 to the transmission return conduit 246 and to simultaneously close fluid communication from the first heat exchanger 222 to the second heat exchanger 264 when the temperature of the transmission fluid exiting the first heat exchanger 222 is less than the second predetermined temperature. The by-pass valve 266 can be configured to close fluid communication from the first heat exchanger 222 to the transmission return conduit 246 and to simultaneously open fluid communication from the first heat exchanger 222 to the second heat exchanger 264 when the temperature of the transmission fluid exiting the first heat exchanger 222 is greater than or equal to a second predetermined temperature. The second predetermined temperature can correspond to an optimum operating temperature for the transmission fluid.

To accomplish this selective warming or cooling of the transmission fluid, the by-pass valve 266 can include an actuator and a valve structure. The actuator can be configured to cause the valve structure to selectively open fluid communication between the valve inlet and one of the two valve outlets while simultaneously closing fluid communication between the valve inlet and the other of the two valve outlets. The actuator can be in fluid communication with the intermediate conduit 268. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit.

The thermal management system 212 can include an exhaust system in fluid communication with the engine 14. The exhaust system can include an exhaust pipe 258 in selective fluid communication with the engine 14 via the exhaust valve 32, a catalytic converter 260 in fluid communication with the pipe 258 and a muffler 262 in fluid communication with the pipe 258. The pipe 258 can extend from the engine 14 to the converter 260, from the converter 260 to the muffler 262, and from the muffler 262 to terminate at an open end adjacent the rear of the vehicle. The open end of the pipe 258 can be in fluid communication with the ambient environment. In addition to expelling exhaust gas produced in the cylinders 26 of the engine 14, the exhaust system 258, 260, 262 can transfer heat produced by the engine and carried by the exhaust gas to the ambient environment.

Figure 4:
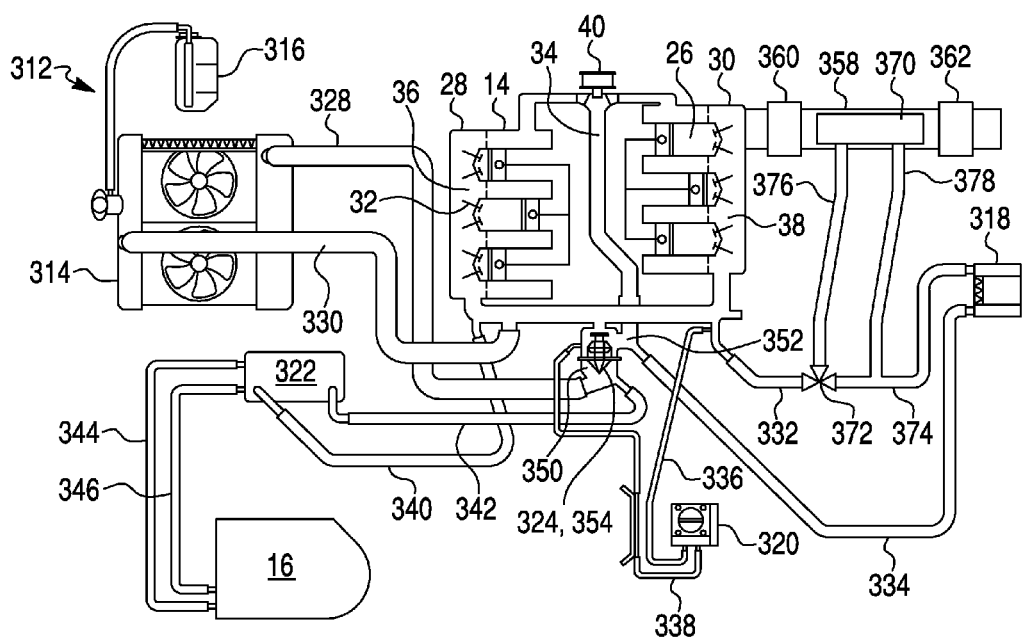
FIG. 4 is a schematic view of a third embodiment of a thermal management system for a vehicle made in accordance with principles of the disclosed subject matter.

FIG. 4 illustrates a third exemplary embodiment of a thermal management system 312 in accordance with the principles of the disclosed subject matter. The fluids acted upon by the system 312 can be engine fluid (such as but not limited to water, ethylene glycol, a combination of water and ethylene glycol, and exhaust gas), transmission fluid (such as, but not limited to, lubricating oil and hydraulic oil (also known as automatic transmission fluid or ATF)), ambient air, and ambient air inside the passenger compartment.

This exemplary third embodiment of the thermal management system 312 can include a radiator 314, a reservoir 316, a heater core 318, a first heat exchanger 322, a thermostat 324, a second (exhaust gas) heat exchanger 370, a by-pass valve 372, and a plurality of conduits 328, 330, 332, 334, 336, 338, 340, 342, 344, 346, 374, 376, 378.

FIG. 4 also schematically illustrates further exemplary details of the engine 14. The engine 14 can include one or more combustion cylinders 26, a first bank 28, a second bank 30, and one or more exhaust valves 32.

The thermal management system 312 can include a water jacket 34, 36, 38 and a water pump 40. The radiator 314 can facilitate the transfer of heat from the engine fluid to the air of the ambient environment in order to cool the engine fluid. The radiator 314 can receive fluid from the engine 14 and receive air from the ambient environment. Engine fluid in the radiator 314 can be selectively returned to the engine 14 via the thermostat 324, as will be described in detail below.

In order to minimize one or more of the potentially adverse effects described above, the thermal management system 312 can direct the flow of engine fluid to by-pass the radiator 314 and the first heat exchanger 322 and can simultaneously permit the flow of engine fluid to pass through the water jacket 34, 36, 38, the heater core 318 and the throttle body 320. As a result, the heat transfer rate between the engine 14 and the engine fluid can be a maximum value and the heat transfer rate between the engine fluid and each of the heater core 318 and the heater 320 and can be a maximum value. Thus, the time elapsed for warm-up of the engine 14, the engine fluid, and the passenger compartment can be minimized.

The thermostat 324 can include a thermostat inlet 350, a thermostat outlet 352 and a thermostat valve structure 354. A main fluid return conduit 328 can extend from the radiator 314 to the thermostat inlet 350 to provide communication of engine fluid from the radiator 314 to the thermostat inlet 350. The main fluid supply conduit 330 can extend from the engine 14 to the radiator 314 to provide communication of engine fluid from the engine 14 to the radiator 314. The actuator can be configured to cause the thermostat valve structure 354 to selectively open and close fluid communication between the thermostat inlet 350 and the thermostat outlet 352.

When the actuator causes the thermostat valve structure 354 to close fluid communication from the thermostat inlet 350 to the thermostat outlet 352, engine fluid from the radiator 314 can be prevented from entering the engine 14, or at least limited to a negligible flow rate value into the engine 14. Since the flow rate of engine fluid through the thermostat 324 can be zero or limited to a negligible value, the flow rate of engine fluid from the engine 14 to the radiator 314 via the main fluid supply conduit 330 can be zero or limited to a negligible value. Therefore, engine fluid flowing through the water jacket 34, 36, 38 can by-pass the radiator 314.

When the temperature of the engine fluid is greater than or equal to the first predetermined temperature, the actuator can cause the valve structure 354 to open fluid communication from the thermostat inlet 350 to the thermostat outlet 352. Thus, engine fluid from the radiator 314 can flow through the thermostat 324 and into the engine 14 at a flow rate sufficient to maintain the operating temperature of the engine within a desired range of temperature values that can be advantageous for engine performance.

The reservoir 316 can be in fluid communication with the radiator 314. The reservoir 316 can store fluid that can be used to replace fluid lost from the volume of fluid circulating in the thermal management system 312. The reservoir 316 can be used to relieve the pressure of the fluid circulating in the system 312 under certain operating conditions.

The heater core 318 can facilitate the transfer of heat from the engine fluid to the ambient air in the passenger compartment 24 in order to warm the ambient air in the passenger compartment. A heater supply conduit 332 can extend from the engine 14 to an inlet of the by-pass valve 372 to provide communication of engine fluid from the engine 14 to the by-pass valve 372. As viewed in FIG. 4, the heater supply conduit 332 can extend from the engine 14 at a position in fluid communication with the right bank portion 38.

An intermediate conduit 374 can extend from a first outlet of the by-pass valve 372 to the heater core 318 to provide communication of engine fluid from the by-pass valve 372 to the heater core 318 along a first path that by-passes the second heat exchanger 372.

The thermal management system 312 can include an exchanger supply conduit 376 extending from a second outlet of the by-pass valve 372 to the second heat exchanger to provide communication of engine fluid from the by-pass valve 372 to the second heat exchanger 370. An exchanger return conduit 378 can extend from the second heat exchanger 370 to the intermediate conduit 374 at a location downstream of the valve 372 to provide communication of engine fluid from the engine 14 to the heater core 318 along a second path that flows through the second heat exchanger 370.

The thermal management system 312 can include a fan and ducting located in the passenger compartment. The fan and ducting are omitted from FIG. 4 for clarity. The fan and ducting can be configured to circulate the ambient air of the passenger compartment between the passenger compartment and the heater core 318.

A heater return line 334 can extend from the heater core 318 to the thermostat outlet 352 to provide communication of engine fluid from the heater core 318 to the engine 14. Since the heater return line 334 connects to the thermostat outlet 352, engine fluid can circulate through the heater core 318 independently of the operation of the thermostat 324. Thus, the thermal management system 312 can minimize the time for warming the passenger compartment.

The throttle body 320 can facilitate the transfer of heat from the heated fluid to the throttle body in order to warm the throttle body. The throttle body 320 can receive heated fluid from the engine 14. The heater core 318 and the throttle body 320 can be connected to the engine 14 in parallel fluid communication.

A throttle supply conduit 336 can extend from the engine 14 to the throttle body heater 320 to provide communication of engine fluid from the engine 14 to the throttle body heater 320. The throttle supply conduit 336 can extend from the engine 14 at a position in fluid communication with the right bank portion 38.

A throttle return line 338 can extend from the throttle body heater 320 to the thermostat outlet 352 to provide communication of engine fluid from the throttle body heater 320 to the engine 14. Since the throttle return line 338 connects to the thermostat outlet 352, engine fluid can circulate through the throttle body heater 320 independently of the operation of the thermostat 324.

Thus, the thermal management system 312 can minimize the time for warming the passenger compartment and optimizing temperatures for other vehicle components and for generally stabilizing operating temperatures of the throttle body 320, engine 14, and transmission 16.

The conduits 336, 338 can be omitted, as desired.

The first heat exchanger 322 can receive engine fluid and can receive fluid from the transmission 16. In a transmission warming mode of operation of the thermal management system 312, the first heat exchanger 322 can facilitate the transfer of heat from the engine fluid to the transmission fluid in order to warm the transmission fluid. In a transmission cooling mode of operation of the system 312, the first heat exchanger 322 can facilitate the transfer of heat from the transmission fluid to the engine fluid in order to cool the transmission fluid.

The thermal management system 312 can include a hot branch line that can extend from the engine 14 to the first heat exchanger 322 to be in fluid communication. The hot branch line can include or can consist essentially of an exchanger supply conduit 340. The exchanger supply conduit 340 can extend from the engine 14 to the first heat exchanger 322 to provide communication of engine fluid from the engine 14 in a path parallel to the heater core path and the throttle body path. Thus, a supply of engine fluid warmed by heat generated by the engine 14 is available to the first heat exchanger 322. Further, it is possible that under certain operating conditions for the engine 14 and the transmission 16 the temperature of the warmed engine fluid can be less than the temperature of the transmission fluid, even if the temperature of the warmed engine fluid is greater than or equal to the first predetermined temperature described above. Thus, the transmission fluid can be warmed or cooled by the engine fluid exiting the engine 14 via the exchanger supply conduit 340, depending on the relative temperatures of the engine fluid and the transmission fluid. As viewed in FIG. 4, the exchanger supply conduit 340 can extend from the engine 14 at a position in fluid communication with the left bank portion 36.

An exchanger return conduit 342 can extend from the first heat exchanger 322 to the thermostat inlet 350 to provide communication of engine fluid from the first heat exchanger 322 to the thermostat 324. Thus, the flow of engine fluid to the first heat exchanger 322 can be controlled by the thermostat 324. Specifically, when the thermostat 324 closes fluid communication between the thermostat inlet 350 and the thermostat outlet 352, the flow rate of engine fluid from the bank portion 38 and/or the bank portion 36 to the exchanger supply conduit 340 can be zero or a negligible value. Conversely, the thermostat 324 can permit fluid communication from the bank portion 36 and/or the bank portion 38 to the exchanger supply conduit 140 when the thermostat opens fluid communication between the inlet 350 and the outlet 352. As a result, the rate of heat transfer from the engine fluid to the transmission fluid via the exchanger 322 can be a negligible value during the cold-start condition. This can minimize the time elapsed for the engine fluid to reach at least the first predetermined temperature and the transmission fluid to reach at least the second predetermined temperature.

A transmission supply conduit 344 can extend from the transmission 16 to the first heat exchanger 322 to provide communication of transmission fluid from the transmission 16 to the exchanger 322. A transmission return conduit 346 can extend from the first heat exchanger 322 to the transmission 16 to provide communication of transmission fluid from the first heat exchanger 322 to the transmission 16.

The thermal management system 312 can include an exhaust system in fluid communication with the engine 14. The exhaust system can include an exhaust pipe 358 in selective fluid communication with the engine 14 via the exhaust valve 32, a catalytic converter 360 in fluid communication with the pipe 358 and a muffler 362 in fluid communication with the pipe 358. The pipe 358 can extend from the engine 14 to the converter 360, from the converter 360 to the muffler 362, and from the muffler 362 to terminate at an open end adjacent the rear of the vehicle. The open end of the pipe 358 can be in fluid communication with the ambient environment. In addition to expelling exhaust gas produced in the cylinders 26 of the engine 14, the exhaust system 358, 360, 362 can transfer to the ambient environment heat that is produced by the engine 14 and carried by the exhaust gas.

To take advantage of this expelled heat, the second heat exchanger 370 can be in fluid communication with the engine fluid (i.e., exhaust gas) flowing through the exhaust pipe 358 (or at least can allow temperature transfer therefrom) and can be in fluid communication with the engine fluid (such as but not limited to, water, ethylene glycol, and a combination of water and ethylene glycol) flowing from the engine 14 to the heater core 318. During the cold-start condition described above, the temperature of the exhaust gas flowing in the exhaust pipe 358 can be greater than the temperature of the engine fluid flowing through the water jacket 34, 36, 38, the heater core 318 and the throttle body 320. Thus, the elapsed time to warm the engine fluid can be further reduced without any further energy consumption by the thermal management system 312 because the exhaust gas is a necessary product of the combustion process in the engine 14. Because the engine fluid can be warmed rapidly, the time elapsed to bring the engine and the transmission up to optimum operating temperatures can be reduced and the time to warm the passenger cabin to the desired temperature can be reduced.

The second heat exchanger 370 can be located within the exhaust pipe 358 between the catalytic converter 360 and the muffler 362, as shown schematically in FIG. 4. In an alternate embodiment, the second heat exchanger 370 (570) can be connected to the exhaust pipe 358 (558) by a supply conduit and return conduit, as will be described below with reference to FIG. 6. In this alternate embodiment, an exhaust by-pass valve can be included to selectively divert exhaust to the second heat exchanger 370 via these separate conduits or to by-pass these separate conduits and the second heat exchanger 370.

The by-pass valve 372 can selectively connect the heater supply conduit 332 in communication with engine fluid from the intermediate conduit 374 or with engine fluid from the second heat exchanger 370. As a result, the engine fluid can either by-pass the second heat exchanger 370 or flow through the heat exchanger 370 before entering the heater core 318.

The by-pass valve 372 can be configured to open communication of engine fluid from the heater supply conduit 332 to the intermediate conduit 374 and to simultaneously close fluid communication from the heater supply conduit 332 to the second heat exchanger 370 when the temperature of the engine fluid exiting the engine 14 is greater than or equal to a third predetermined temperature. The by-pass valve 372 can be configured to close fluid communication from the heater supply conduit 332 to the intermediate conduit 374 and to simultaneously open fluid communication from the heater supply conduit 332 to the second heat exchanger 370 when the temperature of the transmission fluid exiting the transmission 16 is less than the third predetermined temperature. The third predetermined temperature can correspond to an optimum operating temperature for the engine fluid. The third predetermined temperature can be equal to or different from the first predetermined temperature. In an exemplary embodiment, the third predetermined temperature can be equal to or greater than the first predetermined temperature.

To accomplish this selective warming of the engine fluid, the by-pass valve 372 can include an actuator and a valve structure. The actuator can be configured to cause the valve structure to selectively open fluid communication between the valve inlet and one of the two valve outlets while simultaneously closing fluid communication between the valve inlet and the other of the two valve outlets. The actuator can be in fluid communication with the heater supply conduit 332. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit.

When the by-pass valve 372 diverts engine fluid to the second heat exchanger 370, the second heat exchanger 370 can facilitate the transfer of heat from the exhaust gas to the engine fluid. As a result, the engine fluid temperature can be increased more rapidly. Thus, the thermal management system 312 can recover heat exhausted by the engine 14 to improve heating of the passenger compartment, the throttle body, the engine 14, and the transmission 16.

If the third predetermined temperature is greater than the first predetermined temperature described above, then the second heat exchanger 370 can reduce the time needed to achieve the first predetermined temperature of the engine in order to increase efficiency as well as begin transferring more heat to the transmission (through the first heat exchanger 322) earlier and effectively increasing the efficiency of the transmission 16.

Each of FIGS. 5 and 6 schematically illustrate exemplary embodiments of a thermal management system in accordance with the principles of the disclosed subject matter that can recover heat carried by the exhaust gas that is produced by the engine 14 and transfer this recovered heat to the components of the vehicle, such as transmission 16.

FIG. 5 illustrates a fourth exemplary embodiment of a thermal management system 412 in accordance with the principles of the disclosed subject matter. The fluids acted upon by the system 412 can be engine fluid (such as but not limited to exhaust gas), transmission fluid (such as, but not limited to, lubricating oil and hydraulic oil (also known as automatic transmission fluid or ATF), and ambient air.

This exemplary fourth embodiment of the thermal management system 412 can include an exhaust system 458, 460, 462, a first heat exchanger 470, a second heat exchanger 464, a control valve 480, and a plurality of conduits 444, 446, 482, 484, 486.

Although not illustrated in FIG. 5, the engine 14 can include one or more combustion cylinders 26, a first bank 28, a second bank 30, and one or more exhaust valves 32.

The thermal management system 412 can include a radiator, a reservoir, a thermostat, a water jacket and the associated conduits, as described above. These features of the thermal management system 412 have been omitted from the drawings for clarity.

In order to minimize one or more of the potentially adverse effects described above, the thermal management system 412 can direct the flow of transmission fluid to pass through either the first heat exchanger 470 or the second heat exchanger 464. As a result, the temperature of the transmission fluid can be brought up from the cold-start temperature to an operating temperature within a range of optimum temperatures in a minimum amount of time. Further, the system 412 can maintain the operating temperature of the transmission fluid within this range of optimum temperature by directing the transmission fluid to the second heat exchanger 464 in order to cool the transmission fluid, as desired.

The exhaust system 458, 460, 462 can be in fluid communication with the engine 14, as described above with respect to FIG. 2. The exhaust system 458, 460, 462 can include an exhaust pipe 458 in selective fluid communication with the engine 14 via the exhaust valve (see, for example 32 in FIG. 2), a catalytic converter 460 in fluid communication with the pipe 458 and a muffler 462 in fluid communication with the pipe 458. The pipe 458 can extend from the engine 14 to the converter 460, from the converter 460 to the muffler 462, and from the muffler 462 to terminate at an open end adjacent the rear of the vehicle. The open end of the pipe 458 can be in fluid communication with the ambient environment. In addition to expelling exhaust gas produced in the cylinders 26 of the engine 14, the exhaust system 458, 460, 462 can transfer heat produced by the engine 14 and carried by the exhaust gas to the ambient environment.

The first heat exchanger 470 can receive engine fluid from the engine and can receive transmission fluid from the transmission 16. The second heat exchanger 464 can receive transmission fluid from the transmission 16 and can receive air from the ambient environment. A transmission warming mode of the thermal management system 412 can take advantage of the expelled heat carried by the engine fluid. In the transmission warming mode, the first heat exchanger 470 can facilitate the transfer of heat from the engine fluid to the transmission fluid in order to warm the transmission fluid. In a transmission cooling mode of operation of the system 412, the second heat exchanger 464 can be configured as a transmission fluid cooler and can facilitate the transfer of heat from the transmission fluid to the air of the ambient environment in order to cool the transmission fluid. In an exemplary embodiment, the first heat exchanger 470 can be configured as an exhaust gas heat exchanger and can facilitate the transfer of heat from the exhaust gas from the engine 14 to the transmission fluid. Further details of these two modes of operation will be provided below.

A transmission supply conduit 444 can extend from the transmission 16 to an inlet of the control valve 480 to provide fluid communication from the transmission 16 to the control valve 480. A first intermediate conduit 482 can extend from a first outlet of the control valve 480 to the first heat exchanger 470 to provide fluid communication from the control valve 480 to the first heat exchanger 470. A second intermediate conduit 484 can extend from a second outlet of the control valve 480 to the second heat exchanger 464 to provide fluid communication from the control valve 480 to the second heat exchanger 464.

A transmission return conduit 446 can extend from the first heat exchanger 470 to the transmission 16 to provide fluid communication from the first heat exchanger 470 to the transmission 16. A third intermediate conduit 486 can extend from the second heat exchanger 464 to the transmission return conduit 446 at a location between the first heat exchanger 470 and the transmission 16 to provide fluid communication from the second heat exchanger 446 to the transmission 16.

The control valve 480 can selectively connect either the first heat exchanger 470 or the second heat exchanger 464 in fluid communication with the transmission supply conduit 444. As a result, the first heat exchanger 470 can transfer heat from the exhaust gas to the transmission fluid in order to warm the transmission fluid, and the second heat exchanger 464 can transfer heat from the transmission fluid to the air of the ambient environment in order to cool the transmission fluid.

The control valve 480 can be configured to open fluid communication from the transmission supply conduit 444 to the first heat exchanger 470 and to simultaneously close fluid communication from the transmission supply conduit 444 to the second heat exchanger 464 when the temperature of the transmission fluid is less than a second predetermined temperature. The control valve 480 can be configured to close fluid communication from the transmission supply conduit 444 to the first heat exchanger 470 and to simultaneously open fluid communication between the transmission supply conduit 444 and the second heat exchanger 464 when the temperature of the transmission fluid is greater than or equal to the second predetermined temperature. The second predetermined temperature can correspond to an optimum operating temperature for the transmission fluid.

To accomplish this selective warming or cooling of the transmission fluid, the control valve 480 can include an actuator and a valve structure. The actuator can be configured to cause the valve structure to selectively open fluid communication between the valve inlet and one of the two valve outlets while simultaneously closing fluid communication between the valve inlet and the other of the two valve outlets. The actuator can be in fluid communication with the transmission supply conduit 444. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit.

Thus, the thermal management system 412 can recover heat exhausted by the engine 14 to improve heating of the transmission fluid from a cold-start condition and cooling the transmission fluid in order to maintain the operating temperature within a range of optimum temperature values.

The first heat exchanger 470 can be located within the exhaust pipe 458 between the catalytic converter 460 and the muffler 462, as shown schematically in FIG. 5. In an alternate embodiment, the first heat exchanger 470 (570) can be connected to the exhaust pipe 458 by a supply conduit and return conduit, as will be described below with reference to FIG. 6. In this alternate embodiment, a by-pass valve can be included to selectively divert the engine fluid to the first heat exchanger 470 via these separate conduits or to by-pass these separate conduits.

In another alternate embodiment, the thermal management system 412 can include a by-pass valve 492 (shown in phantom in FIG. 5) and a by-pass pipe 494. The by-pass pipe 494 can be in fluid communication with a portion of the exhaust pipe 458 upstream of the second by-pass valve 492 and in fluid communication with a portion of the exhaust pipe 458 downstream of the second by-pass valve 492. The first heat exchanger 470 can be positioned intermediate the upstream and downstream portions of the exhaust pipe 458 and downstream from the second by-pass valve 492. In this alternative embodiment, when the second by-pass valve 492 moves to the by-pass position (i.e., where the valve 492 extends across the fluid passage in the exhaust pipe 458), communication between the upstream and downstream portions of the exhaust pipe 458 is diverted, and the exhaust gas flows from the upstream portion of the exhaust pipe 458, into the by-pass pipe 494, and then into the downstream portion of the exhaust pipe 458, thereby by-passing the first heat exchanger 470. When the second by-pass valve 492 moves to the warming position (i.e., where the valve 492 extends along the length of the exhaust pipe 458), the by-pass valve 492 closes fluid communication to the by-pass pipe 494 and opens fluid communication between the upstream and downstream portions of the exhaust pipe 458 such that exhaust gas can flow through the second heat exchanger 470.

FIG. 6 illustrates a fifth exemplary embodiment of a thermal management system 512 in accordance with the principles of the disclosed subject matter. The fluids acted upon by the system 512 can be engine fluid (such as but not limited to exhaust gas), transmission fluid (such as, but not limited to, lubricating oil and hydraulic oil (also known as automatic transmission fluid or ATF), and ambient air.

This exemplary fourth embodiment of the thermal management system 512 can include an exhaust system 558, 560, 562, a first heat exchanger 570, a second heat exchanger 564, a first by-pass valve 566, a second by-pass valve 592, and a plurality of conduits 544, 546, 568, 588, 590, 594, 596.

Although not illustrated in FIG. 6, the engine 14 can include one or more combustion cylinders 26, a first bank 28, a second bank 30, and one or more exhaust valves 32, as described above, with respect to FIG. 2.

The thermal management system 512 can include a radiator, a reservoir, a thermostat, a water jacket and the associated conduits, as described above. These features of the thermal management system 512 have been omitted from the drawings for clarity.

In order to minimize one or more of the potentially adverse effects described above, the thermal management system 512 can direct the flow of transmission fluid to pass through either the first heat exchanger 570, alone, or through each of the first heat exchanger 570 and the second heat exchanger 564. As a result, the temperature of the transmission fluid can be brought up from the cold-start temperature to an operating temperature within a range of optimum temperatures in a minimum amount of time. Further, the system 512 can maintain the operating temperature of the transmission fluid within this range of optimum temperature by directing the transmission fluid to the second heat exchanger 564 in order to cool the transmission fluid, as needed.

The exhaust system 558, 560, 562 can be in fluid communication with the engine 14, as described above with respect to FIG. 2. The exhaust system 558, 560, 562 can include an exhaust pipe 558 in selective fluid communication with the engine 14 via the exhaust valve (see, for example 32 in FIG. 2), a catalytic converter 560 in fluid communication with the pipe 558 and a muffler 562 in fluid communication with the pipe 558. The pipe 558 can extend from the engine 14 to the converter 560, from the converter 560 to the muffler 562, and from the muffler 562 to terminate at an open end adjacent the rear of the vehicle. The open end of the pipe 558 can be in fluid communication with the ambient environment. In addition to expelling exhaust gas produced in the cylinders 26 of the engine 14, the exhaust system 558, 560, 562 can transfer heat produced by the engine 14 and carried by the exhaust gas to the ambient environment.

The first heat exchanger 570 can receive or be in direct or intermediary contact with engine fluid from the engine and can receive transmission fluid from the transmission 16. The second heat exchanger 564 can receive transmission fluid from the transmission 16 and can receive air from the ambient environment. A transmission warming mode of the thermal management system 512 can take advantage of the expelled heat carried by the engine exhaust. In the transmission warming mode, the first heat exchanger 570 can facilitate the transfer of heat from the engine fluid to the transmission fluid in order to warm the transmission fluid. In a transmission cooling mode of operation of the system 512, the second heat exchanger 564 can be configured as a transmission fluid cooler and can facilitate the transfer of heat from the transmission fluid to the air of the ambient environment in order to cool the transmission fluid.

A transmission supply conduit 544 can extend from the transmission 16 to the first heat exchanger 570 to provide fluid communication from the transmission 16 to the first heat exchanger 570. An intermediate conduit 568 can extend from the first heat exchanger 570 to an inlet of the first by-pass valve 566 to provide fluid communication from the first heat exchanger 570 to the valve 566.

A transmission return conduit 546 can extend from a first outlet of the first by-pass valve 566 to the transmission 16 to provide fluid communication from the by-pass valve 566 and the transmission 16.

An exchanger supply conduit 594 can extend from a second outlet of the first by-pass valve 566 to the second heat exchanger 564 to provide fluid communication from the by-pass valve 566 to the second heat exchanger 564. An exchanger return conduit 596 can extend from the second heat exchanger 564 to the transmission return conduit 546 at a location between the by-pass valve 566 and the transmission 16 to provide fluid communication from the second heat exchanger 564 to the transmission 16.

The first by-pass valve 566 can selectively connect either the first heat exchanger 570, alone, or the first heat exchanger 570 and the second heat exchanger 564, together, in fluid communication with the transmission 16. As a result, the first heat exchanger 570 can transfer heat from the exhaust gas to the transmission fluid in order to warm the transmission fluid of the second heat exchanger 564 can transfer heat from the transmission fluid to the air of the ambient environment in order to cool the transmission fluid.

The first by-pass valve 566 can be configured to close fluid communication from the intermediate conduit 568 to the second heat exchanger 564 and to simultaneously open fluid communication from the intermediate conduit 568 to the transmission return conduit 546 when the temperature of the transmission fluid is less than a second predetermined temperature. The valve 566 can be configured to open fluid communication from the intermediate conduit 568 to the second heat exchanger 564 and to simultaneously close fluid communication from the intermediate conduit 568 to the transmission return conduit 546 when the temperature of the transmission fluid is greater than or equal to the second predetermined temperature. The second predetermined temperature can correspond to an optimum operating temperature for the transmission fluid and can correspond to the second predetermined temperature discussed above.

To accomplish this selective warming or cooling of the transmission fluid, the first by-pass valve 566 can include an actuator and a valve structure. The actuator can be configured to cause the valve structure to selectively open fluid communication between the valve inlet and one of the two valve outlets while simultaneously closing fluid communication between the valve inlet and the other of the two valve outlets. The actuator can be in fluid communication with the intermediate conduit 568. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit.

As discussed above, the transmission fluid can flow through the first heat exchanger 570 during the transmission warming mode of the thermal management system 512 and during the transmission cooling mode of the system 512. In order to prevent, or at least minimize, heat transfer from the exhaust gas to the transmission fluid during the transmission cooling mode, the second by-pass valve 592 can selectively direct the exhaust gas through the first heat exchanger 570 via the exhaust supply conduit 588 or direct the exhaust gas to by-pass the exhaust supply conduit 588, and thus, the first heat exchanger 570. The second by-pass valve 592 can prevent, or at least minimize, heat transfer from the exhaust gas to the transmission fluid during the transmission cooling mode.

The exhaust supply conduit 588 can extend from the exhaust pipe 568 to the first heat exchanger 570 to provide fluid communication from the exhaust pipe 558 to the first heat exchanger 570. The exhaust supply conduit 588 can extend from an upstream portion of the exhaust pipe 558 between the catalytic converter 560 and the second by-pass valve 592.

An exhaust return conduit 590 can extend from the first heat exchanger 570 to the exhaust pipe 558 to provide fluid communication from the first heat exchanger 570 to the exhaust pipe 558. The exhaust supply conduit 590 can extend to a downstream portion of the exhaust pipe 558 between the second by-pass valve 592 and the muffler 562.

To accomplish this selective by-passing of the first heat exchanger 570, the second by-pass valve 592 can include an actuator and a valve structure. The actuator can be configured to cause the valve structure to selectively open or close fluid communication between an upstream portion of the exhaust pipe 558 and a downstream portion of the exhaust pipe 558. The actuator can be in fluid communication with the transmission supply conduit 544. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit.

When the second by-pass valve 592 closes fluid communication between the upstream and downstream portions of the exhaust pipe 558 (indicated by the dotted line in FIG. 6), the exhaust gas in the upstream portion of the exhaust pipe 558 can flow through the exhaust supply conduit 588 and into the first heat exchanger 570. Exhaust gas exiting the first heat exchanger 570 can pass through the exhaust return conduit 590 and enter the downstream portion of the exhaust pipe 558. When the second by-pass valve 592 opens fluid communication between the upstream and downstream portions of the exhaust pipe 558 (indicated by the solid line in FIG. 6), the exhaust gas in the upstream portion of the exhaust pipe 558 can flow directly to the downstream portion of the exhaust pipe 558, thus by-passing the exhaust supply conduit 588 and the first heat exchanger 570.

Thus, the thermal management system 512 can recover heat exhausted by the engine 14 to improve heating of the transmission fluid from a cold-start condition and cooling the transmission fluid in order to maintain the operating temperature within a range of optimum temperature values.

The first heat exchanger 570 can be located externally of the exhaust pipe 558 and in selective fluid communication with the pipe 558 at locations between the catalytic converter 560 and the muffler 562, as shown schematically in FIG. 6. In an alternative embodiment, the first heat exchanger 570 can be located in the exhaust pipe 558. (See, for example, the first heat exchanger 470 of FIG. 5). This alternative embodiment can include a by-pass pipe (see, for example, by-pass pipe 494 of FIG. 5) in fluid communication with a portion of the exhaust pipe 558 upstream of the second by-pass valve 592 and in fluid communication with a portion of the pipe downstream of the second by-pass valve 592. The first heat exchanger 570 can be positioned intermediate the upstream and downstream portions of the exhaust pipe 558 and downstream from the second by-pass valve 592. In this alternative embodiment, when the second by-pass valve 592 closes, communication between the upstream and downstream portions of the exhaust pipe 558 closes, and the exhaust gas can flow from the upstream portion of the exhaust pipe 558, into the by-pass pipe, and then into the downstream portion of the exhaust pipe 558. When the second by-pass valve 592 opens, fluid communication is opened between the upstream and downstream portions of the exhaust pipe 558, and the exhaust gas can flow through the second heat exchanger 570.

Figure 7:
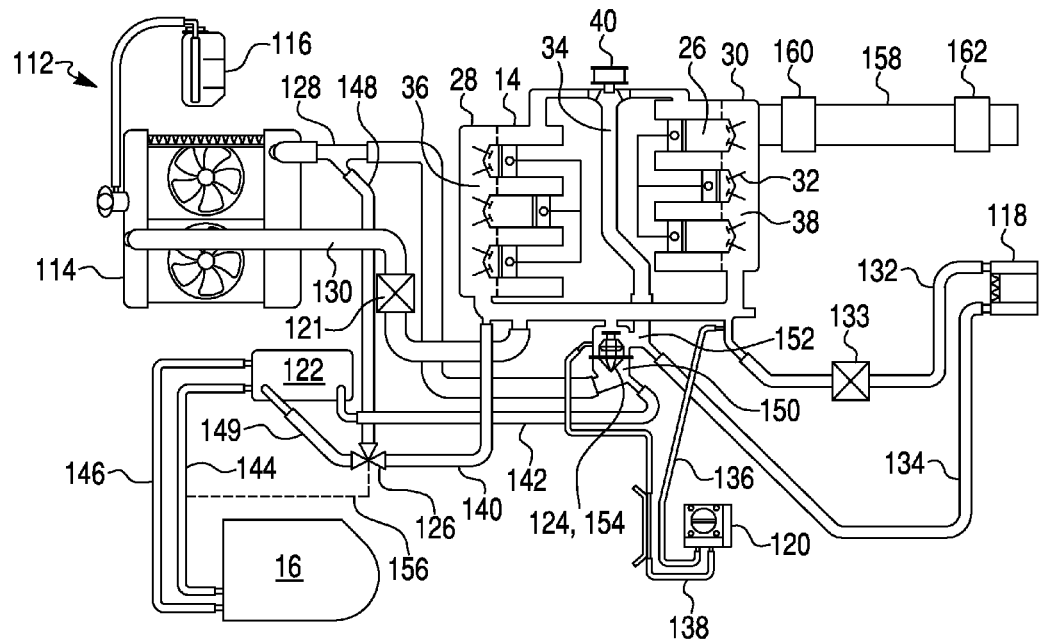
FIG. 7 is a schematic view of a sixth embodiment of a thermal management system for a vehicle made in accordance with principles of the disclosed subject matter.

FIG. 7 illustrates a first variation of the thermal management system 112 of FIG. 2 in accordance with principles of the disclosed subject matter. This thermal management system 112 can include all or many of the features described above with respect to FIG. 2, and additionally can include a radiator valve 121 and a HVAC valve 133. Like reference numbers in FIG. 7 indicate like structures of the exemplary embodiment illustrated in FIG. 2 and these like structures can be arranged, can cooperate and can function in the manner described with respect to the exemplary embodiment of FIG. 2. As will be described below, the first variation of the thermal management system 112 can further enhance the warming mode of the first heat exchanger 122.

The radiator valve 121 can be placed in the main fluid supply conduit 130 intermediate the radiator 114 and the internal combustion engine 14. The radiator valve 121 can cause an increase in the flow rate of engine fluid from the engine 14 through the first heat exchanger 122, as will be described in further detail below.

The radiator valve 121 can include an actuator and a valve structure. The actuator can be configured to cause the valve structure to selectively regulate fluid communication between the engine 14 and the radiator 114 by moving the valve structure between a fully opened position and a partially closed position. In an alternate embodiment, the valve structure can move between a fully opened position and a fully closed position. The actuator can be a mechanical structure (such as, but not limited to, a wax motor in combination with a spring) or the actuator can be an electrically driven device (such as, but not limited to, a thermal sensor in electrical communication with a solenoid or an electric motor) that can be actuated by an input signal received from a thermal sensor and/or an electronic control unit. The thermal sensor can be in fluid communication with the main fluid supply conduit 130.

When the valve structure of the radiator valve 121 is in the fully opened position, the flow rate of engine fluid exiting the valve 121 is substantially the same as a flow rate that would exist should the valve 121 not be present in the main fluid supply conduit 130. That is, the valve 121 does not significantly restrict the flow of engine fluid from the engine 14 to the radiator 114 via the main fluid supply conduit 130. When the valve structure of the valve 121 is in the partially closed position, the valve structure can restrict the flow of engine fluid through the valve 121. That is, the flow rate of the engine fluid exiting the valve 121 can be less than the flow rate of the engine fluid exiting the valve 121 when the valve structure is in the fully opened position. At least a portion of the difference in these flow rates can be seen at the first heat exchanger 122. Thus, the flow rate of fluid through the first heat exchanger 122 can be controlled, i.e. increased upon closing of valve 121. This control in flow rate can enhance the cooling mode and the warming mode of the first heat exchanger 122.

The radiator valve 121 can be controlled independently of the control valve 126. Thus, the radiator valve 121 can increase the flow rate of engine fluid through the first heat exchanger 122 when the first heat exchanger 122 operates in the transmission cooling mode and when the heat exchanger 122 operates in the transmission warming mode described above with respect to FIG. 2. In effect, operation of the radiator valve 121 will cause more or less fluid to flow through the first heat exchanger 122 depending on the position of the valve 121.

The HVAC valve 133 can be placed in the heater supply conduit 132 intermediate the engine 14 and the heater core 118. The HVAC valve can regulate the flow of engine fluid from the engine 14 to the heater core 118, as will be described in further detail below. Operation of the HVAC valve 133 can be independent of the operation of the control valve 126.

The HVAC valve 133 can include an actuator and a valve structure. The actuator can be configured to cause the valve structure to selectively regulate fluid communication between the engine 14 and the heater core 118 by moving the valve structure between a fully opened position and a fully closed position (and possibly intermediate positions, if desired). The actuator can be a mechanical structure (such as, but not limited to, kinematic linkage connected to a mechanical knob mounted in the passenger compartment) or the actuator can be an electrically driven device (such as, but not limited to, a solenoid or an electric motor in electrical communication with an electrical switch mounted in the passenger compartment or with another controller in the vehicle).

When the valve structure of the HVAC valve 133 is in the fully opened position, engine fluid is free to flow from the engine 14 to the heater core 118. When the valve structure of the valve 133 is in the fully closed position, the valve structure can prevent all or most of the flow of engine fluid through the valve 133. Thus, the flow rate of engine fluid through the heater core 118 can be zero or a negligible value. The operation of the HVAC valve 133 can be independent of the operation of the control valve 126 and the radiator valve 121.

The HVAC valve 133 can be omitted from the thermal management system 112 where the desired performance of the system 112 does not warrant the inclusion of the valve 133.

Figure 8:
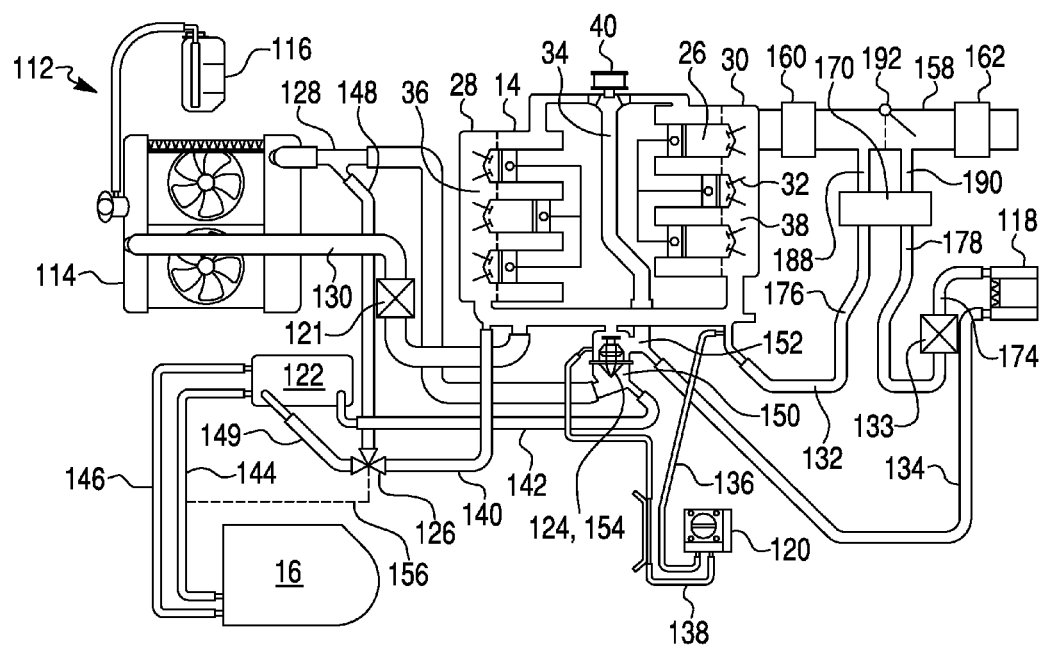
FIG. 8 is a schematic view of a seventh embodiment of a thermal management system for a vehicle made in accordance with principles of the disclosed subject matter.

FIG. 8 illustrates a second variation of the thermal management system 112 of FIG. 2 in accordance with principles of the disclosed subject matter. This thermal management system 112 can include all or many of the features described above with respect to FIG. 2, and additionally can include a radiator valve 121, a HVAC valve 133, a second heat exchanger 170, a by-pass valve 192 and a plurality of conduits 174, 176, 178, 188, 190. Like reference numbers in FIG. 8 indicate like structures of the exemplary embodiment illustrated in FIG. 2 and these like structures can be arranged, can cooperate and can function in the manner described with respect to the exemplary embodiment of FIG. 2. As will be described below, the second variation of the thermal management system 112 can further enhance the warming mode of the first heat exchanger 122.

The radiator valve 121 can be placed in the main fluid supply conduit 130. The valve 121 can include the actuator and valve structure and can function as described above with respect to FIG. 7 to selectively increase/decrease the flow rate of engine fluid through the first heat exchanger 122. Thus, the cooling mode and the warming mode of the first heat exchanger 122 can be enhanced in the manner described above with respect to FIG. 7

The second variation of the thermal management system 112 can include an exhaust system in fluid communication with the engine 14. The exhaust system can include the exhaust pipe 158, the catalytic converter 160 and the muffler 162 as described above with respect to FIG. 2. In addition to expelling exhaust gas produced in the cylinders 26 of the engine 14, the exhaust system 158, 160, 162 can transfer to the ambient environment heat that is produced by the engine 14 and carried by the exhaust gas.

To take advantage of this expelled heat, the second heat exchanger 170 can be in fluid communication with the engine fluid (i.e., exhaust gas) flowing through the exhaust pipe 158 (or at least can allow temperature transfer therefrom) and can be in fluid communication with the engine fluid flowing from the engine 14 to the heater core 118. During the cold-start condition described above with respect to FIG. 2, the temperature of the exhaust gas flowing in the exhaust pipe 158 can be greater than the temperature of the engine fluid flowing through the water jacket 34, 36, 38, the heater core 118 and the throttle body 120. Thus, heat transfer can occur between the exhaust gas and the engine fluid at the heat exchanger 170, and the elapsed time to warm the engine fluid can be further reduced without any further energy consumption by the second variation of the thermal management system 112 because the exhaust gas is a necessary product of the combustion process in the engine 14. Because the engine fluid can be warmed rapidly, the time elapsed to bring the engine 14 and the transmission 16 up to optimum operating temperatures can be reduced and the time to warm the passenger cabin to the desired temperature can be reduced.

In the transmission warm-up mode, the second heat exchanger 170 can facilitate the transfer of heat from the engine exhaust to the engine fluid. The increased heat energy available in the engine fluid can enhance the warm-up mode of the first heat exchanger 122 to provide heat to transmission 16 and can also enhance the heat transferred to the heat core 118, as will be described in detail below.

The heater supply conduit 132 can extend from the engine 14 to an exchanger supply conduit 176 and the exchanger supply conduit 176 can extend from the heater supply conduit 132 to the second heat exchanger 170 to provide communication of engine fluid from the engine 14 to the second heat exchanger 170. As viewed in FIG. 8, the heater supply conduit 132 can extend from the engine 14 at a position in fluid communication with the right bank portion 38.

An exchanger return conduit 178 can extend from the second heat exchanger 170 to an intermediate conduit 174. The intermediate conduit 174 can extend from the exchanger return conduit 178 to the heater core 118 to provide communication of engine fluid from the second heater exchanger 170 to the heater core 118.

The HVAC valve 133 can be placed in the intermediate line 174 between the second heat exchanger 170 and the heater core 118. The valve 133 can include the actuator and the valve structure and can function as described above with respect to FIG. 7 to regulate the flow rate of engine fluid through the heater core 118. The HVAC valve 133 can be omitted from the thermal management system 112 where the desired performance of the system 112 does not warrant the inclusion of the valve 133.

The engine fluid can flow through the second heat exchanger 170 during the transmission warming mode of the thermal management system 112 and during the transmission cooling mode of the system 112. In order to prevent, or at least minimize, heat transfer from the exhaust gas to the engine fluid (for example, during the transmission cooling mode), the by-pass valve 192 can selectively direct the exhaust gas through the second heat exchanger 170 via the exhaust supply conduit 188 or direct the exhaust gas to by-pass the exhaust supply conduit 188, and thus, bypass the first heat exchanger 170. The by-pass valve 192 can prevent, or at least minimize, heat transfer from the exhaust gas to the engine fluid for various reasons, such as during the transmission cooling mode or when the demand for heat transfer from the heater core 118 is at or below a minimum threshold value.

The exhaust supply conduit 188 can extend from the exhaust pipe 158 to the first heat exchanger 170 to provide fluid communication from the exhaust pipe 158 to the second heat exchanger 170. The exhaust supply conduit 188 can extend from an upstream portion of the exhaust pipe 158 between the catalytic converter 160 and the by-pass valve 192.

An exhaust return conduit 190 can extend from the second heat exchanger 170 to the exhaust pipe 158 to provide fluid communication from the second heat exchanger 170 back to the exhaust pipe 158. The exhaust supply conduit 190 can extend to a downstream portion of the exhaust pipe 158 between the by-pass valve 192 and the muffler 162.

To accomplish this selective by-passing of the second heat exchanger 170, the by-pass valve 192 can include an actuator and a valve structure. The actuator can be configured to cause the valve structure to selectively pass or redirect fluid communication from an upstream portion of the exhaust pipe 158 and a downstream portion of the exhaust pipe 158. The actuator can be in fluid communication with the heater supply conduit 132. The actuator can be a mechanical structure or the actuator can be an electrically driven device that can be actuated by an input signal received from a thermal sensor and/or an electronic control unit.

When the by-pass valve 192 redirects fluid communication through the second heat exchanger 170 (as indicated by the dotted line in FIG. 8), the exhaust gas in the upstream portion of the exhaust pipe 158 can flow through the exhaust supply conduit 188 and into the second heat exchanger 170. Exhaust gas exiting the first heat exchanger 170 can pass through the exhaust return conduit 190 and enter the downstream portion of the exhaust pipe 158. When the by-pass valve 192 is in the open position (indicated by the solid line in FIG. 8), the exhaust gas in the upstream portion of the exhaust pipe 158 can flow directly to the downstream portion of the exhaust pipe 158, thus by-passing the exhaust supply conduit 188 and the second heat exchanger 170.

Thus, the second variation of the thermal management system 112 illustrated in FIG. 8 can recover heat exhausted by the engine 14 to, for example, improve heating of the transmission fluid from a cold-start condition and improve heating of the passenger compartment via the heater core 118 from a cold-start condition.

The second heat exchanger 170 can be located externally of the exhaust pipe 158 and in selective fluid communication with the pipe 158 at locations between the catalytic converter 160 and the muffler 162, as shown schematically in FIG. 8. In an alternative embodiment, the second heat exchanger 170 can be located in the exhaust pipe 158. (See, for example, the first heat exchanger 470 of FIG. 5). This alternative embodiment can include a by-pass pipe (see, for example by-pass pipe 494 of FIG. 5) in fluid communication with a portion of the exhaust pipe 158 upstream of the by-pass valve 192 and in fluid communication with a portion of the pipe downstream of the by-pass valve 192. The second heat exchanger 170 can be positioned intermediate the upstream and downstream portions of the exhaust pipe 158 and downstream from the by-pass valve 192. In this alternative embodiment, when the by-pass valve 192 closes, communication between the upstream and downstream portions of the exhaust pipe 158 closes, and the exhaust gas can flow from the upstream portion of the exhaust pipe 158, into the by-pass pipe, and then into the downstream portion of the exhaust pipe 158. When the by-pass valve 192 opens, fluid communication is opened between the upstream and downstream portions of the exhaust pipe 158, and the exhaust gas can flow through the second heat exchanger 170.

Figure 9:
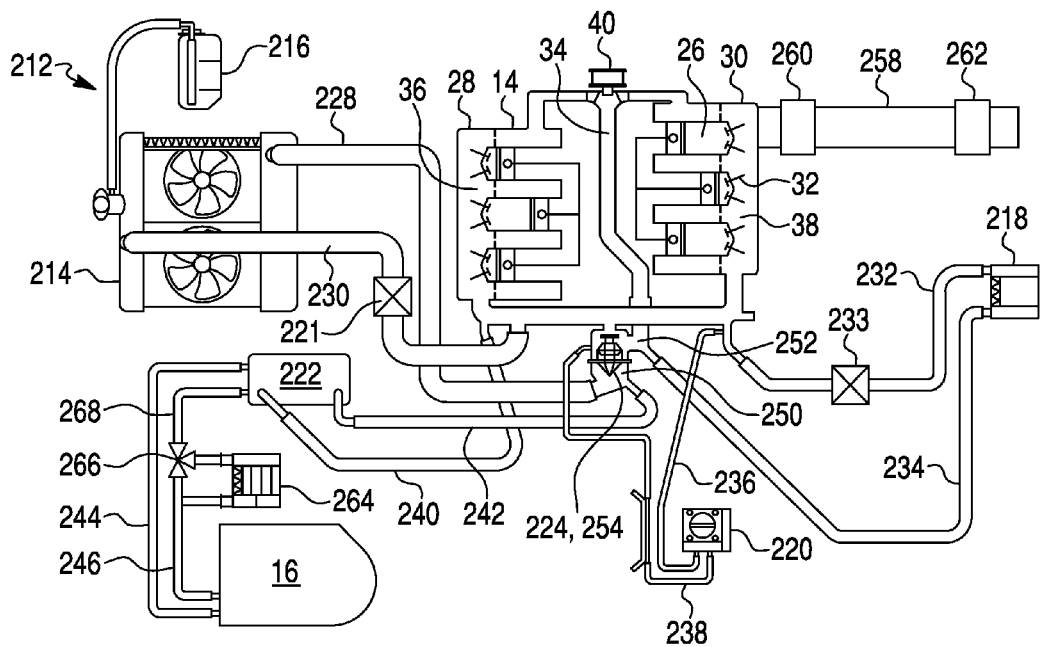
FIG. 9 is a schematic view of an eighth embodiment of a thermal management system for a vehicle made in accordance with principles of the disclosed subject matter.

FIG. 9 illustrates a first variation of the thermal management system 212 of FIG. 3 in accordance with principles of the disclosed subject matter. This thermal management system 212 can include all or many of the features described above with respect to FIG. 3, and additionally can include a radiator valve 221 and a HVAC valve 233. Like reference numbers of FIG. 9 indicate like structures of the exemplary embodiment illustrated in FIG. 3 and these like structures can be arranged, can cooperate and can function in the manner described with respect to the exemplary embodiment of FIG. 3.

The radiator valve 221 can be placed in the main fluid supply conduit 230. The valve 221 can include the actuator and valve structure and can function as described above with respect to FIG. 7 to selectively increase or control the flow rate of engine fluid through the first heat exchanger 222. Thus, the cooling mode and the warming mode of the first heat exchanger 222 can be enhanced in the manner described above with respect to FIG. 7

The HVAC valve 233 can be placed in the heater supply conduit 232. The valve 233 can include the actuator and valve structure and can function as described above with respect to FIG. 7 to regulate the flow rate of engine fluid through the heater core 218.

Figure 10:
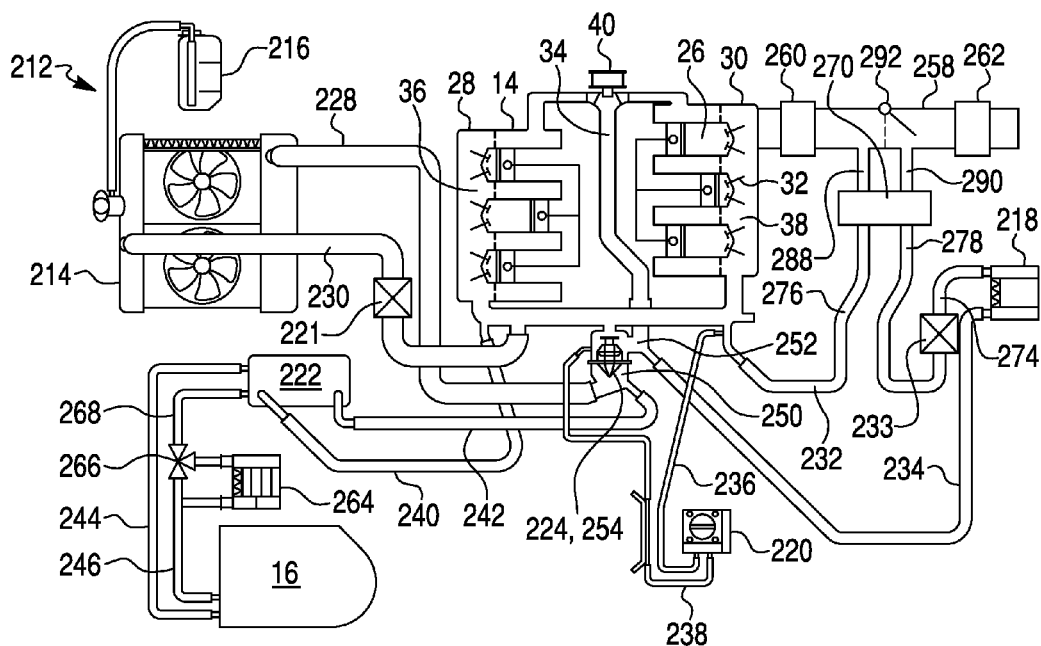
FIG. 10 is a schematic view of a ninth embodiment of a thermal management system for a vehicle made in accordance with principles of the disclosed subject matter.

FIG. 10 illustrates a second variation of the thermal management system 212 of FIG. 3 in accordance with principles of the disclosed subject matter. This thermal management system 212 can include all or many of the features described above with respect to FIG. 3 and additionally can include a radiator valve 221, a HVAC valve 233, a second heat exchanger 270, a by-pass valve 292 and a plurality of conduits 274, 276, 278, 288, 290. Like reference numbers of FIG. 10 indicate like structures of the exemplary embodiment illustrated in FIG. 3 and these like structures can be arranged, can cooperate and can function in the manner described with respect to the exemplary embodiment of FIG. 3. As will be described below, the second variation of the thermal management system 212 can further enhance the warming mode of the first heat exchanger 222.

The radiator valve 221 can be placed in the main fluid supply conduit 230. The valve 221 can include the actuator and valve structure and can function as described above with respect to FIG. 7 to selectively increase or control the flow rate of engine fluid through the first heat exchanger 222. Thus, the cooling mode and the warming mode of the first heat exchanger 222 can be enhanced in the manner described above with respect to FIG. 7.

The structure(s), function(s) and cooperation(s) of the second heat exchanger 270, the by-pass valve 292 and the plurality of conduits 274, 276, 278, 288, 290 can be the same as those of second heat exchanger 170, by-pass valve 192 and the plurality of conduits 174, 176, 178, 188, 190 described above with respect to FIG. 8.

The HVAC valve 233 can be placed in the heater supply conduit 232. The valve 233 can include the actuator and valve structure and can function as described above with respect to FIG. 7 to regulate the flow rate of engine fluid through the heater core 218.

Thus, the second variation of the thermal management system 212 illustrated in FIG. 10 can recover heat exhausted by the engine 14 to improve heating of the transmission fluid from a cold-start condition and improve heating of the passenger compartment via the heater core 218 from a cold-start condition.

The second heat exchanger 270 can be located externally of the exhaust pipe 158 and in selective fluid communication with the pipe 158 at locations between the catalytic converter 160 and the muffler 162, as shown schematically in FIG. 10. In an alternative embodiment, the second heat exchanger 270 can be located in the exhaust pipe 258, as described above with respect to the alternate embodiment of FIG. 8.

It is to be understood that when the actuator of any the valves discussed above causes the valve structure to close fluid communication from one component to another component, fluid from the one component can be prevented from entering the other component, or at least limited to a negligible flow rate value into the other component. Alternatively, the valves can be continuously adjustable from a totally open position to a totally closed position in order to finely control fluid flow and temperature changes.

The engine 14 can be oriented in the longitudinal direction L or in the traverse direction T of the vehicle 10, as indicated in FIG. 1. The engine can be mounted forward of the front axles, rearward of the rear axles, or intermediate the front and rear axles. In the exemplary embodiment of FIG. 1, the power source is configured as an transversely-oriented front-mounted internal combustion engine. However, it is contemplated that the engine can be a hybrid or electric engine.

The transmission 16 can be oriented in the longitudinal direction L or in the traverse direction T of the vehicle 10, as indicated in FIG. 1. The transmission 16 can be an automatic transmission, a manual transmission, or a semi-automatic transmission. The transmission 16 can be selectively coupled with the engine 14. Exemplary couplings can include, but are not limited to, a friction disc clutch and a torque converter. The transmission 16 can include a plurality of discrete gear ratios or can be configured to provide a continuously variable range of gear ratios between a maximum gear ratio and a minimum gear ratio.

Although each of the exemplary embodiments schematically illustrates a single exhaust pipe 158, 258, 358, 458, or 558, it should be understood that one or more exhaust pipes can be in fluid communication with the engine 14. For example, each exhaust valve 32 can be in fluid communication with a respective exhaust pipe, In another exemplary embodiment, the exhaust valves 32 of the first bank 28 can be in fluid communication with a first exhaust pipe and the exhaust valves 32 of the second bank 30 can be in fluid communication with a second exhaust pipe. Each of the heat exchangers 170, 270, 370, 470, and 570 can be in fluid communication with any combination of the exemplary exhaust pipes from one to all.

While certain embodiments of the invention are described above, it should be understood that the invention can be embodied and configured in many different ways without departing from the spirit and scope of the invention. For example, in an exemplary variation of the embodiment FIG. 1, the exchanger branch conduit 148 can extend directly from the radiator 14 to the control valve 126. In another example, the control valve 126 can be configured to selectively open fluid communication between the valve outlet 149 and one of the warm inlet and the cool inlet while simultaneously closing fluid communication between the valve outlet 149 and the other of the warm inlet and the cool inlet, or to simultaneously open fluid communication between the valve outlet 149 and both of the warm inlet and the cool inlet. In another example, any of the particular features from each of the specifically disclosed embodiments can be added to any of the other embodiments, or replace the similar feature from any of the other embodiments without departing from the spirit and scope of the disclosed subject matter.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A thermal management system for a vehicle including an engine and a transmission, the system comprising:
 a radiator configured for fluid communication with the engine;
 a thermostat including an inlet, an outlet, and a valve structure, the inlet being in fluid communication with the radiator, the outlet being configured for fluid communication with the engine, and the valve structure movable between a first position and a second position such that when the valve is in the first position the valve substantially prevents fluid communication between the inlet and the outlet, and when the valve is in the second position the inlet is in fluid communication with the outlet;
 a first heat exchanger in fluid communication with the transmission;
 a hot branch line extending from the engine to the first heat exchanger and in fluid communication with each of the engine and the first heat exchanger; and
 a heat exchanger return line in fluid communication with each of the first heat exchanger and the inlet of the thermostat such that the valve structure closes fluid communication between the heat exchanger return line and the outlet of the thermostat when the valve structure is in the first position and the valve structure opens fluid communication between the heat exchanger return line and the outlet of the thermostat when the valve structure is in the second position.

2. The thermal management system according to claim 1, further comprising:

a heater core in ambient fluid communication with a passenger compartment of the vehicle, the heater core being in separate fluid communication with the engine and the outlet of the thermostat such that fluid from the heater core returns directly to the engine and fluid from the engine flows to the heater core along a first circuit, and fluid from the engine flows to the first heat exchanger along a second circuit, and the first circuit and second circuit are parallel circuits with respect to each other.

3. The thermal management system according to claim 1, further comprising:
a heater core in ambient fluid communication with a passenger compartment of the vehicle,
a first fluid circuit in fluid communication with the engine and the heater core such that during operation fluid flows from the engine to the heater core, then flows through the heater core, and then flows from the heater core to the outlet of the thermostat; and
a second fluid circuit in fluid communication with the engine and the first heat exchanger such that during operation fluid flows from the engine to the first heat exchanger, flows through the first heat exchanger, and then flows to the inlet of the thermostat.

4. The thermal management system according to claim 1, further comprising:
a heater core, wherein,
the engine includes a first bank having at least a first cylinder and a second bank having at least a second cylinder,
the first bank is in fluid communication with the hot branch line, and
the second bank is in fluid communication with the heater core.

5. The thermal management system according to claim 1, further comprising:
a main fluid supply line in fluid communication with each of the engine and the radiator; and
a radiator valve positioned in the main fluid supply line at a position between the engine and the radiator, the radiator valve configured to selectively operate in a first mode and selectively operate in a second mode, wherein
when in the first mode, the flow rate of fluid to the first heat exchanger is substantially unchanged, and
when in the second mode, the flow rate of fluid to the first heat exchanger is increased as compared to the flow rate when the radiator valve operates in the first mode.

6. The thermal management system according to claim 1, further comprising:
a main fluid return line in fluid communication with each of the engine and the radiator;
a radiator valve positioned in the main fluid return line at a position between the engine and the radiator;
a heater core;
a heater supply line in fluid communication with the engine and the heater core; and
an HVAC valve positioned in the heater supply line between the engine and the heater core.

7. The thermal management system according to claim 1, wherein the hot branch line consists essentially of a line and a control valve connected between the engine and the first heat exchanger.

8. The thermal management system according to claim 7, wherein the control valve is in direct fluid communication with the radiator.

9. The thermal management system according to claim 1, wherein the hot branch line consists essentially of a line connected between the engine and the first heat exchanger.

10. The thermal management system according to claim 1 further comprising:
a cold branch line in fluid communication with the radiator; and
a valve in fluid communication with the hot branch line, the cold branch line, and the heat exchanger and configured to selectively connect the hot branch line in fluid communication with the first heat exchanger and to selectively connect the cold branch line in fluid communication with the first heat exchanger.

11. The thermal management system according to claim 1 further comprising:
a main fluid supply line in fluid communication with each of the radiator and the inlet of the thermostat;
a cold branch line connected to the main fluid supply at a position between the radiator and the inlet of the thermostat and in fluid communication with the radiator; and
a valve in fluid communication with the first heat exchanger and the cold branch line and configured to selectively connect the cold branch line in fluid communication with the first heat exchanger.

12. The thermal management system according to claim 1, further comprising:
a second heat exchanger; and
a valve in fluid communication with the first heat exchanger, the second heat exchanger and the transmission and configured to selectively operate in a first mode and selectively operate in a second mode, wherein
when in the first mode, fluid from the first heat exchanger bypasses the second heat exchanger and flows to the transmission, and
when in the second mode, fluid from the first heat exchanger flows through the second heat exchanger and then flows to the transmission.

13. The thermal management system according to claim 1 further comprising:
a heater core in fluid communication with the engine;
an exhaust pipe in fluid communication with the engine; and
a second heat exchanger in fluid communication with the exhaust pipe and the heater core.

14. The thermal management system according to claim 13 wherein,
the second heat exchanger is located within the exhaust pipe.

15. The thermal management system according to claim 13, further comprising:
a by-pass valve configured to selectively operate in a first mode and selectively operate in a second mode;
a heater supply line in fluid communication with the engine and the by-pass valve;
an intermediate line in fluid communication with the by-pass valve and the heater core;
an exchanger supply line in fluid communication with the by-pass valve and the second heat exchanger;
an exchanger return line in fluid communication with the second heat exchanger and the intermediate line; and
a heater return line in fluid communication with the heater core and the engine, wherein,
when the by-pass valve operates in the first mode, fluid from the heater supply line bypasses the second heat exchanger and flows to the heater core, and when the by-pass valve operates in the second mode, fluid from the heater supply line flows through the second heat exchanger and then through the heater core.

16. The thermal management system according to claim 13, further comprising:
a heater supply line in fluid communication with the engine;
an exchanger supply line in fluid communication with the heater supply line and the second heat exchanger;
an exchanger return line in fluid communication with the second heat exchanger;
an intermediate line in fluid communication with the exchanger return line and the heater core;
an exhaust supply line in fluid communication with the exhaust pipe and the second heat exchanger;
an exhaust return line in fluid communication with the second heat exchanger and the exhaust pipe;
a by-pass valve positioned in the exhaust pipe between the exhaust supply line and the exhaust return line and configured to selectively operate in a first mode and selectively operate in a second mode, wherein
when in the first mode, fluid from the exhaust pipe bypasses the second heat exchanger, and
when in the second mode, fluid from the exhaust pipe flows through the second heat exchanger.

17. A vehicle comprising:
an engine;
a transmission; and
a thermal management system according to claim 1.

18. A method for directing fluid through a vehicle thermal management system, the method comprising:
providing
an engine including engine fluid configured to flow through the engine,
a radiator in fluid communication with the engine,
a thermostat including an inlet in fluid communication with the radiator and an outlet in fluid communication with the engine,
a transmission connected to the engine, and
a first heat exchanger in fluid communication with the transmission and in separate fluid communication with the engine and the inlet of the thermostat;
circulating the engine fluid through the engine radiator, the engine, and the first heat exchanger;
causing the engine fluid exiting the first heat exchanger to directly enter the inlet of the thermostat;
circulating transmission fluid through the transmission and the first heat exchanger.

19. The method for directing fluid through a vehicle thermal management system of claim 18 further comprising:
providing
a heater core,
a second heat exchanger in fluid communication with exhaust gas from the engine, the engine fluid and the heater core;
in a first mode, circulating engine fluid through the engine, the second heater exchanger, and the heater core; and
in a second mode, bypassing the second heat exchanger and circulating engine fluid through the engine and the heater core.

20. The method for directing fluid through a vehicle thermal management system of claim 18, further comprising:
causing the engine fluid entering the first heat exchanger to be supplied from at least one of the radiator and the engine via a control valve.

21. The method for directing fluid through a vehicle thermal management system of claim 20, further comprising:
controlling the control valve to distribute an amount of engine fluid supplied from each of the radiator and the engine to the first heat exchanger based on a temperature of at least one of the engine fluid and the transmission fluid.

22. The method for directing fluid through a vehicle thermal management system of claim 18 wherein circulating the engine fluid through the engine radiator, the engine, and the first heat exchanger occurs via a first circuit that begins and ends at the thermostat.

23. The method for directing fluid through a vehicle thermal management system of claim 22 further comprising:
circulating the engine fluid through a heater core via a second circuit that is parallel to the first circuit, and wherein the second circuit begins at the thermostat and ends between the engine and the thermostat.

24. The method for directing fluid through a vehicle thermal management system of claim 22 further comprising:
isolating the engine fluid located in the first circuit from the engine fluid located in the second circuit such that engine fluid in the first circuit does not mix with engine coolant in the second circuit until after the engine fluid from each circuit re-enters the engine.

25. The method for directing fluid through a vehicle thermal management system of claim 18 further comprising:
cooling the transmission fluid using a heat exchanger that is configured to transfer heat from the transmission fluid to ambient air.

26. The method for directing fluid through a vehicle thermal management system of claim 25 further comprising:
heating the transmission fluid using heat carried from exhaust from the engine.

27. The method for directing fluid through a vehicle thermal management system of claim 18 further comprising:
heating the transmission fluid using heat carried by exhaust from the engine.

28. The method for directing fluid through a vehicle thermal management system of claim 18 further comprising:
heating the engine fluid using heat carried by exhaust from the engine.

29. The method for directing fluid through a vehicle thermal management system of claim 18 further comprising:
heating the transmission fluid using heat carried by engine fluid exiting the engine.

\* \* \* \* \*

UNITED STATES PATENT AND TRADEMARK OFFICE
CERTIFICATE OF CORRECTION

| | | |
|---|---|---|
| PATENT NO. | : 9,796,244 B2 | |
| APPLICATION NO. | : 14/158012 | |
| DATED | : October 24, 2017 | |
| INVENTOR(S) | : Michael D. Cook et al. | |

It is certified that error appears in the above-identified patent and that said Letters Patent is hereby corrected as shown below:

On the Title Page

In item (72) please amend inventor's name Timothy Bressau to Tim Bressau

Signed and Sealed this
Tenth Day of July, 2018

Andrei Iancu
*Director of the United States Patent and Trademark Office*